US012738083B1

(12) United States Patent
Pingali et al.

(10) Patent No.: US 12,738,083 B1
(45) Date of Patent: Sep. 15, 2026

(54) SYSTEM AND METHOD OF KNOWLEDGE GRAPH BASED ID ANOMALY DETECTION IN ORDER TO DETERMINE IF THE ANOMALY IS ASSOCIATED WITH ID FRAUD

(71) Applicant: Jumio Corporation, Sunnyvale, CA (US)

(72) Inventors: Ashwin Pingali, Parker, CO (US); Arman Mohseni-Kabir, Carlsbad, CA (US); Marzieh Mehdizadeh, Sunnyvale, CA (US); Lulu Li, Millbrae, CA (US); Sudha Vijayakumar, Campbell, CA (US); Osvaldo Driollet, Carlsbad, CA (US)

(73) Assignee: Jumio Corporation, Sunnyvale, CA (US)

( * ) Notice: Subject to any disclaimer, the term of this patent is extended or adjusted under 35 U.S.C. 154(b) by 239 days.

(21) Appl. No.: 18/499,057

(22) Filed: Oct. 31, 2023

(51) Int. Cl.
*G06V 30/19* (2022.01)
*G06N 5/02* (2023.01)

(52) U.S. Cl.
CPC .......... *G06V 30/1914* (2022.01); *G06N 5/02* (2013.01)

(58) Field of Classification Search
CPC ... G06T 2207/20221; G06T 5/50; G06T 7/13; G06T 2207/10024; G06V 30/413; G06V 30/414; G06V 20/95; G06V 30/18105; G06V 30/19173; G06V 30/22; G06V 30/40; G06V 30/1914; G06F 16/53; G06F 16/55; G06Q 50/265
USPC ....... 382/206, 173, 176, 177, 155, 156, 190, 382/195, 229, 290, 291; 705/342
See application file for complete search history.

(56) References Cited

U.S. PATENT DOCUMENTS

| | | | |
|---|---|---|---|
| 7,769,704 | B2 | 8/2010 | Marfatia |
| 10,991,053 | B2 | 4/2021 | Pingali |
| 11,238,115 | B1 | 2/2022 | Newman |
| 11,816,596 | B2 | 11/2023 | Pingali |
| 12,112,519 | B1 | 10/2024 | Polichroniadis |
| 12,147,647 | B2 | 11/2024 | Marchetti |
| 2010/0049538 | A1 | 2/2010 | Frazer |
| 2012/0158633 | A1 | 6/2012 | Eder |
| 2015/0317449 | A1 | 11/2015 | Eder |
| 2016/0321661 | A1 | 11/2016 | Hammond |
| 2016/0364794 | A1 | 12/2016 | Chari |
| 2019/0122111 | A1 | 4/2019 | Min |

(Continued)

OTHER PUBLICATIONS

"Bilot et al., ""Graph Neural Networks for Intrusion Detection: A Survey,"" May 12, 2023, IEEEAccess, vol. 11,2023, pp. 49114-49121."

(Continued)

*Primary Examiner* — Chad Dickerson
(74) *Attorney, Agent, or Firm* — Patent Law Works, LLP

(57) ABSTRACT

The disclosure includes a system and method for anomaly detection of an ID using a knowledge graph. Human curated knowledge may be used as a source of information to aid the system. Image fragments are created from an image of an ID. A knowledge graph schema may be used to define node names and relationships. The image fragments are processed and evaluated according to a workflow. The evaluation results can be compared with a gold standard for a good image. The use of a knowledge graph permits patterns in the images to be used to detect anomalies, which may include potential fraud.

24 Claims, 34 Drawing Sheets

(56) References Cited

U.S. PATENT DOCUMENTS

| | | | | |
|---|---|---|---|---|
| 2019/0259033 | A1 | 8/2019 | Reddy | |
| 2019/0312869 | A1 | 10/2019 | Han | |
| 2019/0340614 | A1 | 11/2019 | Hanis | |
| 2019/0340615 | A1 | 11/2019 | Hanis | |
| 2019/0372940 | A1 | 12/2019 | McDougall | |
| 2020/0401835 | A1 | 12/2020 | Zhao | |
| 2021/0248268 | A1 | 8/2021 | Ardhanari | |
| 2021/0304021 | A1 | 9/2021 | Puri | |
| 2022/0075948 | A1* | 3/2022 | Yuan | G06N 20/00 |
| 2022/0111960 | A1 | 4/2022 | Tran | |
| 2022/0292262 | A1 | 9/2022 | Japa | |
| 2023/0132720 | A1* | 5/2023 | Khmaissia | G06N 3/088 382/181 |
| 2023/0291756 | A1 | 9/2023 | Monnig | |
| 2024/0013220 | A1 | 1/2024 | Martins | |
| 2024/0221411 | A1* | 7/2024 | Wells | G06V 30/413 |
| 2024/0303662 | A1 | 9/2024 | Shah | |
| 2025/0200630 | A1 | 6/2025 | Wang | |

OTHER PUBLICATIONS

Li et al., “Recognizing Object by Components With Human Prior Knowledge Enhances Adversarial Robustness of Deep Neural Networks,” Jan. 18, 2023, IEEE Transactions on Pattern Analysis and Machine Intelligence, vol. 45, No. 7, Jul. 2023, pp. 8861-8866.

Liu et al., “Combining Graph Neural Networks With Expert Knowledge for Smart Contract Vulnerability Detection,” Jul. 7, 2021, IEEE Transactions on Knowledge and Data Engineering, vol. 35, No. 2, Feb. 2023, pp. 1296-1302.

Wang et al., “Fake News Detection via Knowledge-driven Multimodal Graph Convolutional Networks,” Jun. 8, 2020, ICMR ’20, Oct. 26-29, 2020, Dublin, Ireland, pp. 540-546.

Xu et al., “Evidence-aware Fake News Detection with Graph Neural Networks,” Apr. 25, 2022, WWW ’22: Proceedings of the ACM Web Conference 2022, pp. 2501-2505.

* cited by examiner

California USA DRIVER LICENSE
Fig. 7A
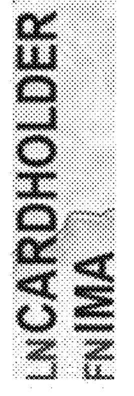
Fig. 7B
DL I1234568
Fig. 7C
DOB 08/31/1977
Fig. 7D
08311977
Fig. 7E
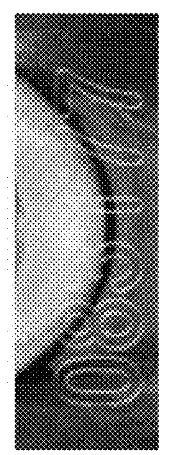
Fig. 7F From left to right: 1. Head not shown in full. 2. Head not centred. 3. Correct.

Fig. 15A

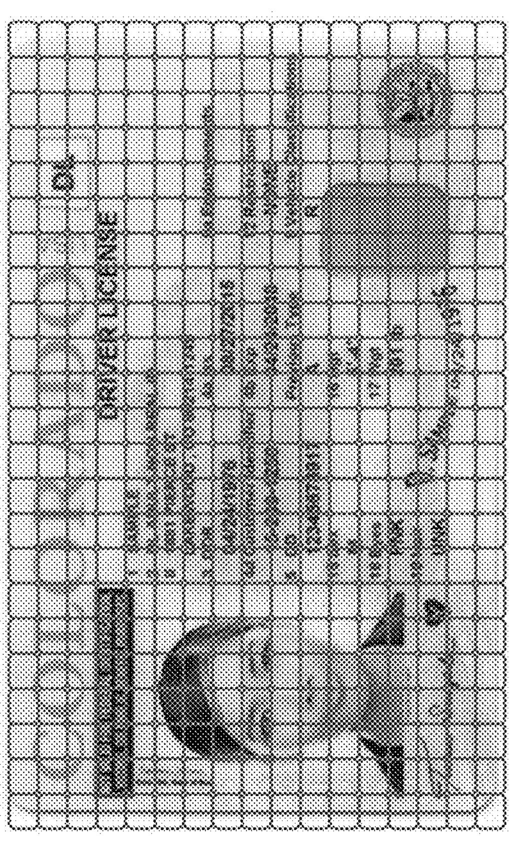
Fig. 17A
Fig. 17B
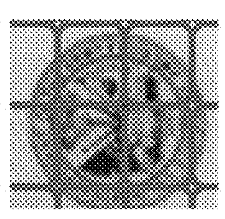
Fig. 17C
DRIVER LICENSE
Fig. 17D

Negative Space Fragments

Negative Space fragments are obtained by masking a portion of a describable image Selfie Masking Entire ID Masking Face Masking on ID

SYSTEM AND METHOD OF KNOWLEDGE GRAPH BASED ID ANOMALY DETECTION IN ORDER TO DETERMINE IF THE ANOMALY IS ASSOCIATED WITH ID FRAUD

BACKGROUND

Physical documents with information pertaining to a person are used for verifying the identity of the person. In today's digitized world authenticity is verified based on an image of such a document and an equipment (hardware, software, and Deep Learning/Machine Learning (DL/ML) models) captured by the image capturing software. Anomaly detection in such cases would mean two broad classes of anomalies: 1) the anomaly that identifies if the image of the document is not issued by the stated issuing authority on the document thereby disproving its authenticity or 2) the anomaly identifies parts of the image of the document that were manipulated from the original image of a genuine document.

The problem at scale involves checking if the DL/ML pipelines are functioning as expected and identifying fraudulent documents effectively and as a secondary check for testing and validating the equipment/software pipeline's efficacy pertaining to different forms of forgery that are seen being implemented by clever forgers.

Identifying anomalies also needs explanation or supporting evidence that can be corroborated by a human. For the case of verifying the authenticity, we need to verify if the invariant parts (security features etc.) are as expected for a document issued by the stated authority and also the variant parts (Identifying information) are not manipulated in any fashion.

Every day authenticity verifying equipment and software pipelines have to validate the images of several types of documents (more than 5000 document types in the case of Jumio, Inc.) and these documents can be organized using several contexts. They could be classified based on a document label that alludes to the purpose of the document such as a passport, Identity Card, Driver's License etc. There could be more fine-grained labels such as a diplomatic passport, commercial driver's license etc. Document types will thus have to be organized using a variety of contexts such as labels. They could also be organized by attributes of the document that makes it hard for forging the document such as security features. The documents could also be contextualized by what type of information they capture about the identifying person and where on the document it is captured for a variety of document classes. The documents could also be contextualized by how different images of documents within the same class vary from person to person and also parts that are similar or have some relationship when it belongs to one person. Information on the document can be encoded based on where the information is stored on the document, how it stored (like the color, patterns etc.) and rules on how they need to be stored (such as how the face image needs to be in a photograph)

SUMMARY

A system and method for ensuring that an Identification Document (ID) is in fact issued by the supposed issuing authority (such as a Federal Government, State licensing office or other bodies) and the document has not been manipulated in any form of fashion after it being issued. ID Verification is done through equipment that has a deep learning model that has learnt to spot anomalies or through a software that takes images of the ID documents and tries to spot anomalies. Such equipment and software image processing pipelines require testing and validation and this method can also serve as a tool for testing and validating the decisions produced by such equipment and pipelines.

In one implementation, an elaborate grammar and vocabulary is created that will enable encoding of each ID class (such as US Passport) and a formalized encoding method for each individual image that belongs to the ID class as composed of several smaller image fragments represented as cellular fragments with a variety of associated properties. This grammar and vocabulary will serve to store Knowledge—as it pertains to the expectation of an ID image pertaining to a class, as it pertains to expected variances in image fragments with known manipulated, as it pertains to expected variances due to the capture of the ID image by a camera that serves as the input to the equipment or the Deep learning-based software processing pipeline. The elaborate Grammar and vocabulary together with an efficient mode of representing the knowledge in a graph, processing or updating the knowledge at scale for a large number of ID classes and retrieving the knowledge efficiently to identify and explain anomalies using the associated visual grammar.

Just as languages are composed of alphabets, words, sentences and paragraphs all of which are used for storing knowledge and for communication, the visual grammar composed of smaller cellular fragments (words) each with associated properties (alphabets) and larger composite fragments (sentences) and looking at several such instances of a composite fragment across multiple ID images of the same class (paragraphs), the visual language and grammar provides us with a means of efficient communication, explanation and reasoning and storage of knowledge.

BRIEF DESCRIPTION OF THE DRAWINGS

The disclosure is illustrated by way of example, and not by way of limitation in the figures of the accompanying drawings in which like reference numerals are used to refer to similar elements.

FIGS. 7A, 7B, 7C, 7D, 7E, and 7F illustrate examples of patches from a California Driver's License in accordance with some implementations.

FIG. 15A is an example of receiving an image and a class label as inputs, and outputting a determination of whether a class anomaly exists in accordance with an implementation.

FIG. 17A illustrates an example of a visual grammar with cellular fragments for an example of a Colorado Drivers' License in accordance with an implementation.

FIGS. 17B and 17D illustrate text fragments of FIG. 17A.

FIG. 17C illustrates a describable fragment of FIG. 17A.

DETAILED DESCRIPTION

A user wishing to establish his/her identity with an entity, e.g., a government agency or a commercial enterprise, may be asked to submit an image of an identification document (ID) through the entity's application on his/her mobile phone or through the entity's portal on a web browser. The entity may, depending on the implementation, request verification of the document by the document evaluation systems and methods described herein. The ID may, for example, be a driver's license, passport, national identification card, or other type of photo ID. There are numerous ID Documents. They could be passports, IDs, drivers' licenses and even within each of these there could be sub-categories. Another way of looking at the documents is their purpose (proof of a skill, an ownership), attributes of the document that prevents or makes it hard for forgers. We also can look at ID documents based on the specific information they capture about the person and about the institution creating it. We also can look at the documents as pieces that vary from person to person, parts that do not vary from person to person, parts that are similar when it belongs to a person etc. These are some example contexts in which a document can be encoded into a knowledge graph.

Fraudsters may leverage technology to automate a series of repeated, fraudulent attempts to mislead an entity until a successful vector of attack is discovered, and their attacks may become increasingly more sophisticated (e.g., using photo editing software, such as Photoshop to modify images of valid documents to create fake/invalid documents, such as fake IDs). Anomalies may be detected in individual portions of an ID. However, as discussed below in more detail a knowledge graph with a knowledge graph schema may be used to perform structural anomaly detection. Ground truth learning and human curation of some types of information may be supported In one implementation, the use of knowledge graphs and a knowledge graph scheme permits the creation of the fingerprints of one or more sub-graphs of image fragments of an image, converting the fingerprints into vectors, comparing the vectors for similarity, and then identifying the sub-graphs for discrepancies and evaluating the risk associated with the discrepancy to categorize the anomaly (e.g., as a fraud or as having quality issues, as a few examples). The use of sub-graphs and vectors permits relationships between invariant portions of images to be analyzed and used to detect anomalies that might not be visible to the naked eye.

High Level System For ID Knowledge Graph Anomaly Detection

Figure 1:
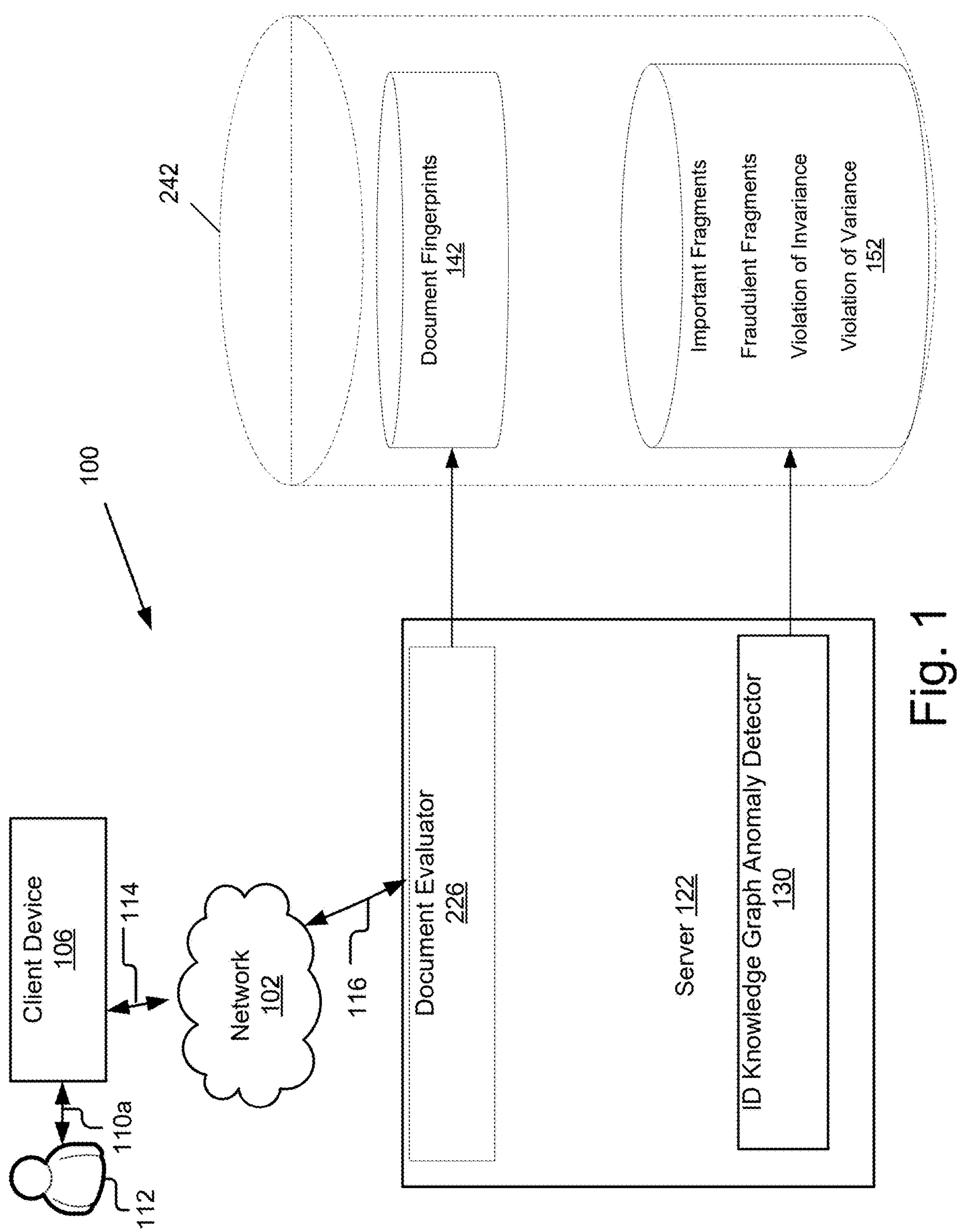
FIG. 1 is a block diagram of one example implementation of a system for document evaluation using an ID knowledge graph to detect anomalies in accordance with some implementations.
Figure 1A:
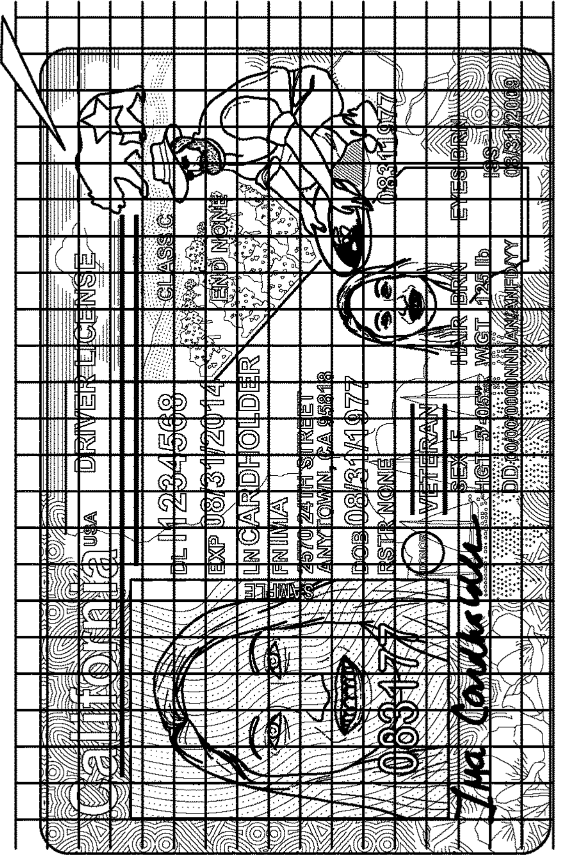
FIG. 1A illustrates aspects of an embedding space and embedding vector in accordance with an implementation.
Figure 1A:
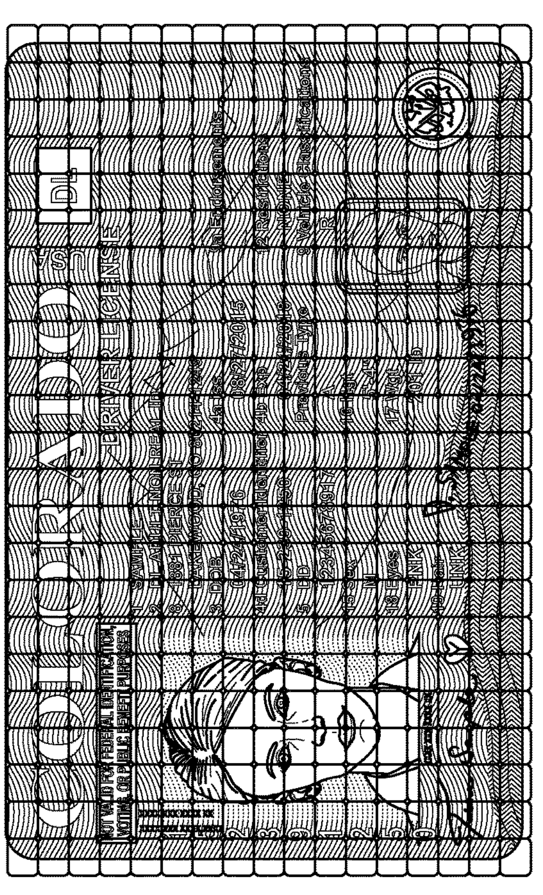

FIG. 1 is a block diagram of an example system 100 for document evaluation in accordance with some implementations. In one implementation, a server 122 includes an ID Knowledge Graph Anomaly Detector 130 and a document evaluator 226. An ID Knowledge Graph Anomaly Detector 130 may be implemented in different ways. In one implementation, images of IDs are fragmented into cellular fragments. FIG. 1A illustrates examples of different types of ID broken up using the same cellular fragments in terms of defined size in pixels. As described below in more detail, the fragments have fragment properties and a positional value.

Figure 1B:
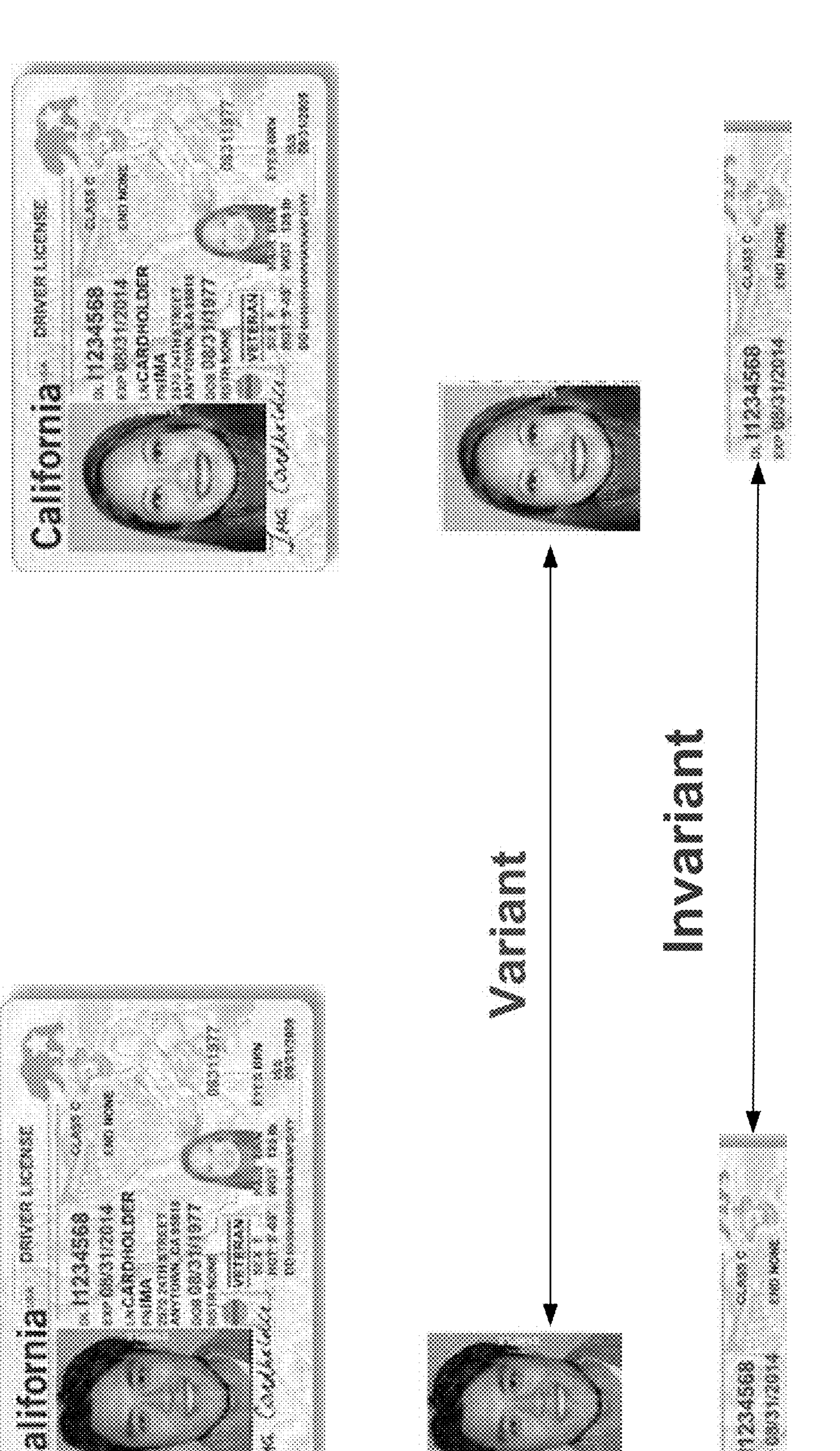
FIG. 1B illustrates aspects of using cellular fragments in accordance with an implementation.

FIG. 1B illustrates how an image of an ID may have fragments for a valid image that should be variant between different IDs (e.g., photo images) and invariant portions (e.g., for a particular ID type, some textual or other portions may be the same. FIGS. 18A, 18B, 18C, and 18D illustrate an example in which a background should be variant. In one implementation, Invariance belief violations and variance belief violations may be detected.

In one implementation, the anomaly detector 130 evaluates fragments including evaluating important fragments, checking for fraudulent fragments, and checking for violations of invariance conditions and violations of variance conditions. These evaluations may be stored in a database 152.

A document evaluator 226 may be included to make decisions whether a document is correctly classified. Bounding boxes may be identified around invariant fragments of an ID image. The document evaluator 226 may store in a database 142 a set of document fingerprints created by a sub-graph of bounding boxes around invariant fragments in the image and then connecting these bounding boxes as a graph by evaluating them as a sub-graph so that the relative position of these fragments is captured. In one implementation, for an individual image, the size of the fragments, the properties of the fragments, and the distance between different fragments can be represented on a single subgraph converted into a fingerprint.

Figure 1C:
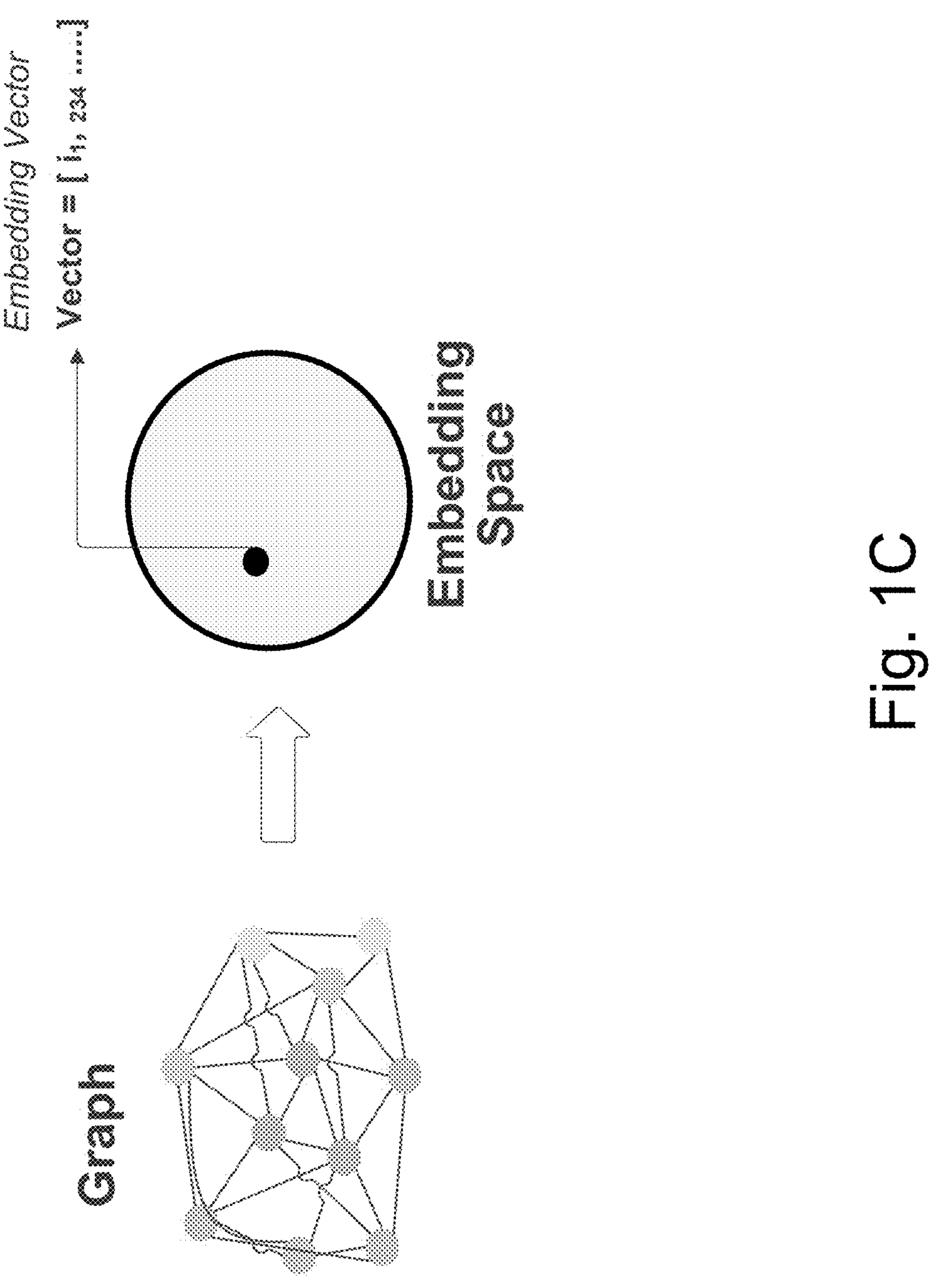
FIG. 1C illustrates examples of subgraphs and an embedding space in accordance with an implementation.

Referring to FIG. 1C, a sub-graph can be converted into an embedding space as a vector and compared as a sub-graph. An exemplary algorithm for sub-graph matching in the Neuromatch algorithm for subgraph matching. Neuromatch is a graph neural network (GNN) architecture for efficient subgraph matching that learns graph embeddings in an embedding space that reflects the subgraph relationship properties. The sub-graph can be converted into an ordered embedding space as a vector or compared as a sub-graph. However, more generally other subgraph matching functions could be used besides Neuromatch.

As depicted, in one example the system 100 includes a server 122 and a client device 106 coupled for electronic communication via a network 102. It should be noted that the database 142 and 152 may be optionally implemented as sub-databases that are a part of a larger database 242 (illustrated by dashed lines).

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc. A user 112 may interact with client device 106, such as taking selfies of themselves or taking photo image of photo IDs, which are sent to document evaluator 226.

Although a single client device 106 is shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit). The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality described herein may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, a server 122 includes an instance of the document evaluator 226. However, in some implementations, the components and functionality of the document evaluator 226 may be entirely client-side (e.g., at client device 106; not shown), entirely server side (i.e., at server 122, as shown), or divide among the client device 106 and server 122.

Figure 2:
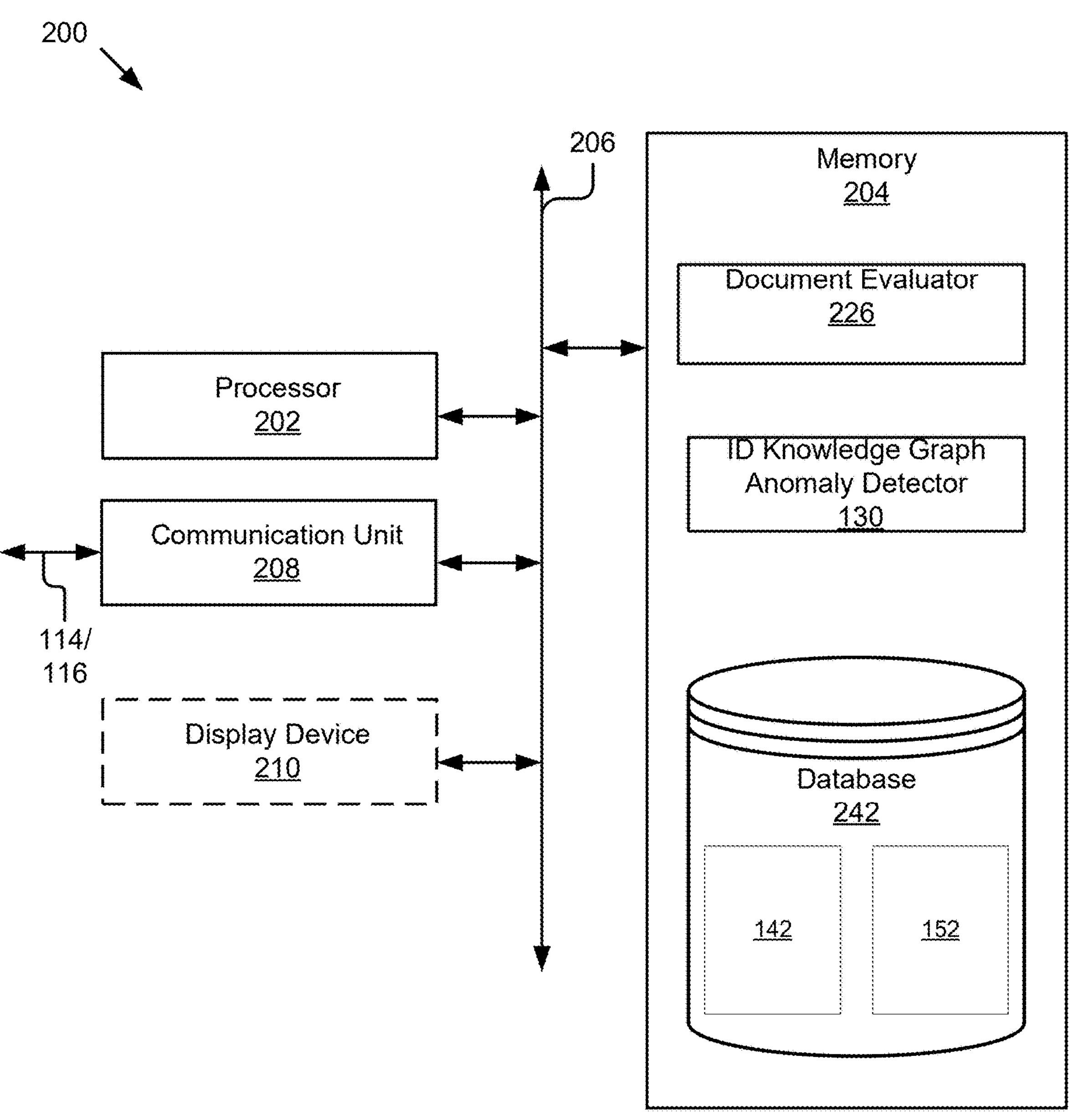
FIG. 2 is a block diagram of an example computing device in accordance with some implementations.

FIG. 2 is a block diagram of an example computing device 200 including an instance of the document evaluator 226 and ID knowledge Graph Anomaly Detector 130. In the illustrated example, the computing device 200 includes a processor 202, a memory 204, a communication unit 208, an optional display device 210, and a data storage 214. In some implementations, the computing device 200 is a server 122, the memory 204 stores the document evaluator 226, and the communication unit 208 is communicatively coupled to the network 102 via signal line 116. In some implementations, the computing device 200 is a client device 106, which may occasionally be referred to herein as a user device, and the client device 106 optionally includes at least one sensor (not shown), and the communication unit 208 is communicatively coupled to the network 102 via signal line 114.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing, and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the document evaluator 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations. In some implementations, the memory 204 stores a document database 242. In some implementations, the document database 242 is stored on a portion of the memory 204 comprising a network accessible storage device.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 218 is a conventional type such as a liquid crystal display (LCD), light emitting diode (LED), touchscreen, or any other similarly equipped display device, screen, or monitor. The display 218 represents any device equipped to display electronic images and data as described herein. In some implementations, the display device 218 is optional and may be omitted.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure.

Example ID Knowledge Graph Anomaly Detector

Figure 3:
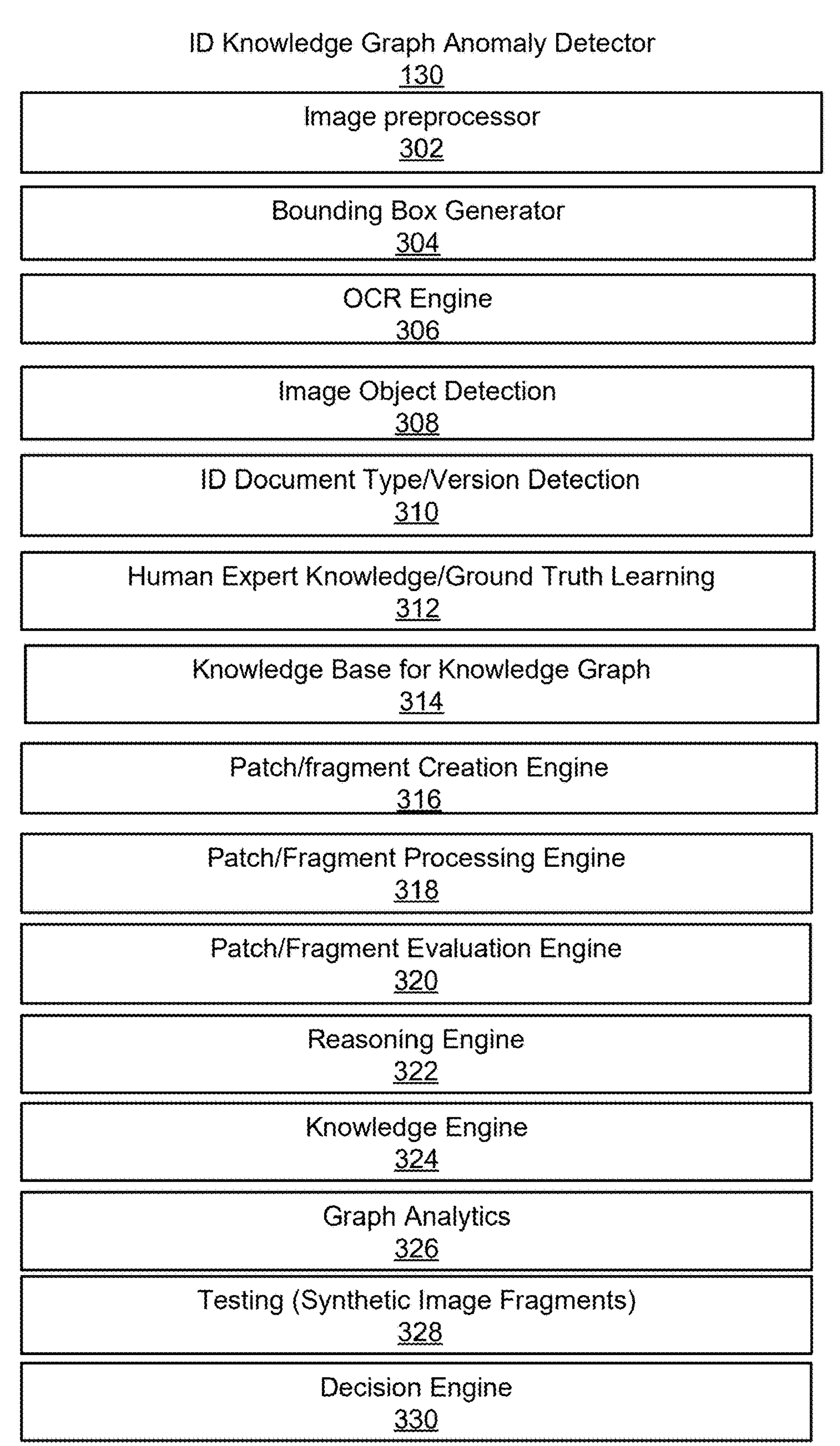
FIG. 3 is a block diagram of an example ID knowledge graph anomaly detector in accordance with some implementations.

FIG. 3 illustrates a high-level example of an ID Knowledge Graph Anomaly Detector 130. An image preprocessor 302 is provided to process images of IDs that are received. In one implementation, a bounding box generator/304 generates bounding boxes used to define patches fragments of images, where a patch may also be called a fragment. For example, for a particular type of ID, bounding boxes may be selected to generate fragments. However, more generally, as discussed below, patch creation functions may include semantic segmentation and/or other machine learning techniques to generate patches/fragments.

An OCR engine 306 may be included to detect text. The OCR engine 306 converts text in an image into machine-readable text. In some implementations, when the OCR engine 306 executes, the presence of text is recognized in the input image. In some implementations, the OCR engine 306 derives information describing one or more of a size, position, orientation (e.g., horizontal, or vertical), and textual content of each bounding box. For example, the size and position of the bounding box around a driver's license (DL) number could be represented by a set of coordinates associated with the four vertices of the bounding box and the content could be represented as "I1234568." In some implementations, the OCR engine 306 may assign a bounding box to individual characters.

An image object detection engine 308 detects objects in images, such as faces.

In one implementation, an ID document type/version detection engine 310 performs at least some steps to determine the ID document type/version, such as detecting the state of a driver's license or the nation associated with a national ID card or passport.

A human expert knowledge processor 312 may be provided to support human curated information. For example, in one implementation, human experts curate documents to provide multidimensional view into IDs to generate a hierarchical multidimensional view of identification documents based at least in part on human curated expert knowledge. Human experts may also curate other information related to providing ground truth data and/or defining a gold standard for a good image.

A knowledge base 314 stores and provides access to information for implementing a knowledge graph with a knowledge graph schema. It supports providing information for a workflow for a given ID type/version, a knowledge graph schema, a set of patch fragment creation functions, a set of patch processing functions and a set of evaluation functions. For example, a workflow may be assigned to a specific document type (e.g., a California Driver's License) that is different than a workflow for a different type of ID (e.g., a Canadian driver's license from the province of Quebec). In other words, the patch creation functions, patch processing functions, and evaluation functions are tailored for a particular type/version of ID. The knowledge base may include an extensible grammar to learn properties of patches and implement an orchestration workflow for each ID type and version. The knowledge base 314 support workflows coordinating the processes for selecting patches, processing patches, and evaluating patches for a particular type of ID.

A patch creation engine 316 creates patches for an image. It may be used as a source of information, bounding box information. However, it may select a subset of bounding boxes. Also, it may utilize machine learning models or semantic processing in creating patches, as discussed below in more detail. A patch processing engine 318 and patch evaluation engine 320 may be included to perform patch processing and patch evaluation functions, respectively.

A reasoning engine 322 may be provided to check on deviations in invariant relationships, learn to distinguish manipulations by fraudsters, and identify quality issues. A knowledge engine 324 may be used to infer rules to support the reasoning engine 322. In one implementation, a graph analytics engine 326 learns fragment relationships. In one implementation, insights from the graph analytics engine 326 are provided to the knowledge engine, which in turn provides rules for the reasoning engine. In one implementation, the reasoning engine 322 utilizes a combination of causal reasoning and neural networks to build a decisioning engine 330 that detects anomalies within images of IDs.

In one implementation, a testing module 328 generates synthetic image fragment for testing and training purposes. For example, the testing module 328 may generate synthetic image fragments having variations in features such as fine variations in bounding box size or box location, as one example. For example, the testing module 328 may generate variations in image fragment that are imperceptible to the naked eye but that a fraudster may accidentally include in a fake ID.

The decision engine 330 may generate combined scores from different fragment evaluations. For example, one or more anomaly scores may be generated for a two-dimensional pattern in an individual ID and used to generate an overall anomaly score. This is analogous to generating and evaluating fingerprints in an image pattern that are compared to a gold standard. The components 302, 304, 306, 308, 310, 314, 316, 318, 320, 322, 324, 326, 328, 330 and subcomponents, sub-subcomponents, etc. thereof are communicatively coupled to one another and/or to the document database to perform the features and functionalities described herein.

Figure 4A:
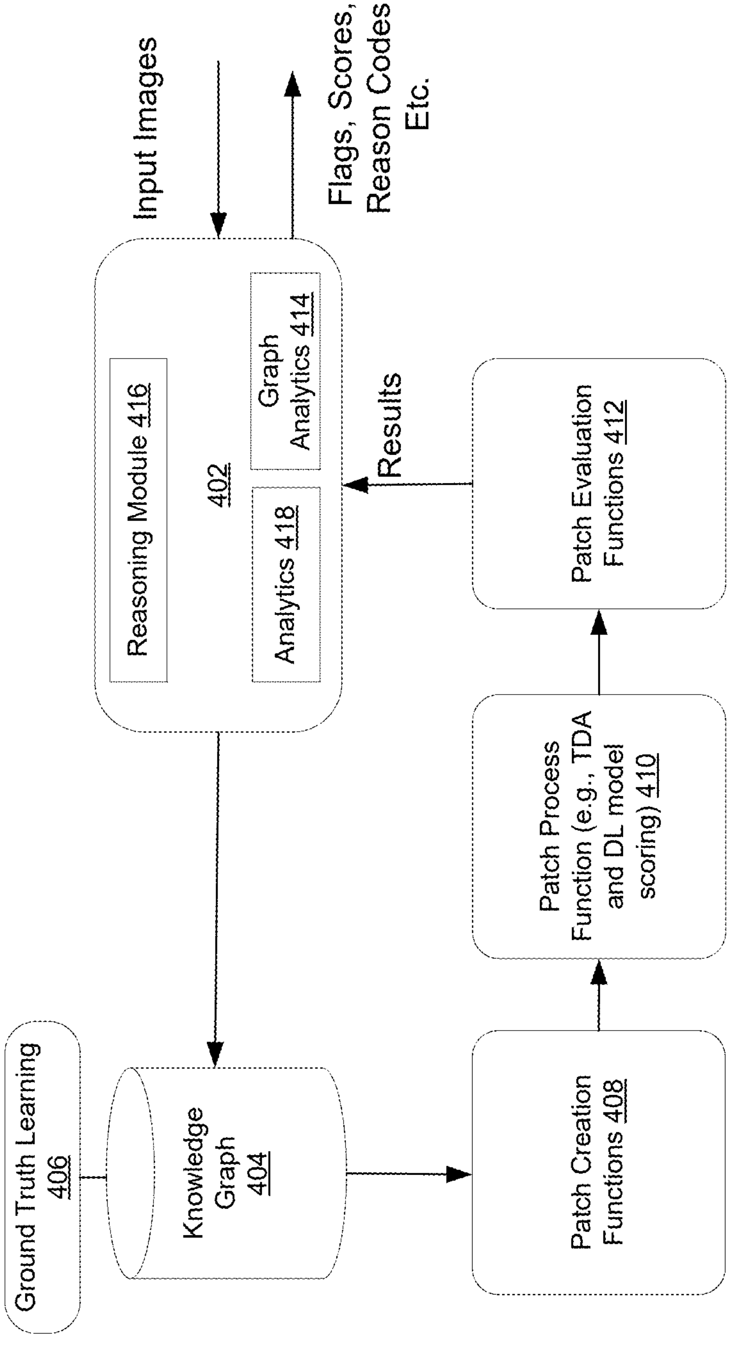
FIG. 4A is a block diagram of an example ID knowledge graph anomaly detector implementation in accordance with some implementations.

FIG. 4A illustrates at a high-level figure of an example of some of the data flows in structural ID anomaly detection. In one implementation, input images of IDs are received at a server 402, which may, for example, be implemented in the cloud. In one implementation, received images are pushed to a bucket and into a folder for a specific ID type. In one implementation, an API call is made to the knowledge graph 404 with the ID type and the image (or an image URL link). The knowledge graph 404 includes ground truth learning 406, which may be based in part on human curated expert knowledge, although more generally it may include other sources of information and machine learning. The API call triggers a workflow specific to a particular ID type, in one implementation, the workflow includes a patch creation function 408, patch processing function 410, and patch evaluation function 412. An individual evaluation function (or a set of evaluation functions) may be compared against a gold standard for a good image.

In one implementation, a separate function collates the results from the patch evaluation and comparison functions to calculate anomaly scores. Additionally, other information may be associated with an ID image, such as flags, reason codes, and patch details. For example, flags may be generated for IDs to accept or reject an ID image. Reason codes may explain the reason for an anomaly score. A graph analytics module 414, reasoning module 416, and analytics module 418 may be included, as previously discussed to improve the decisions made about IDs.

Figure 4B:
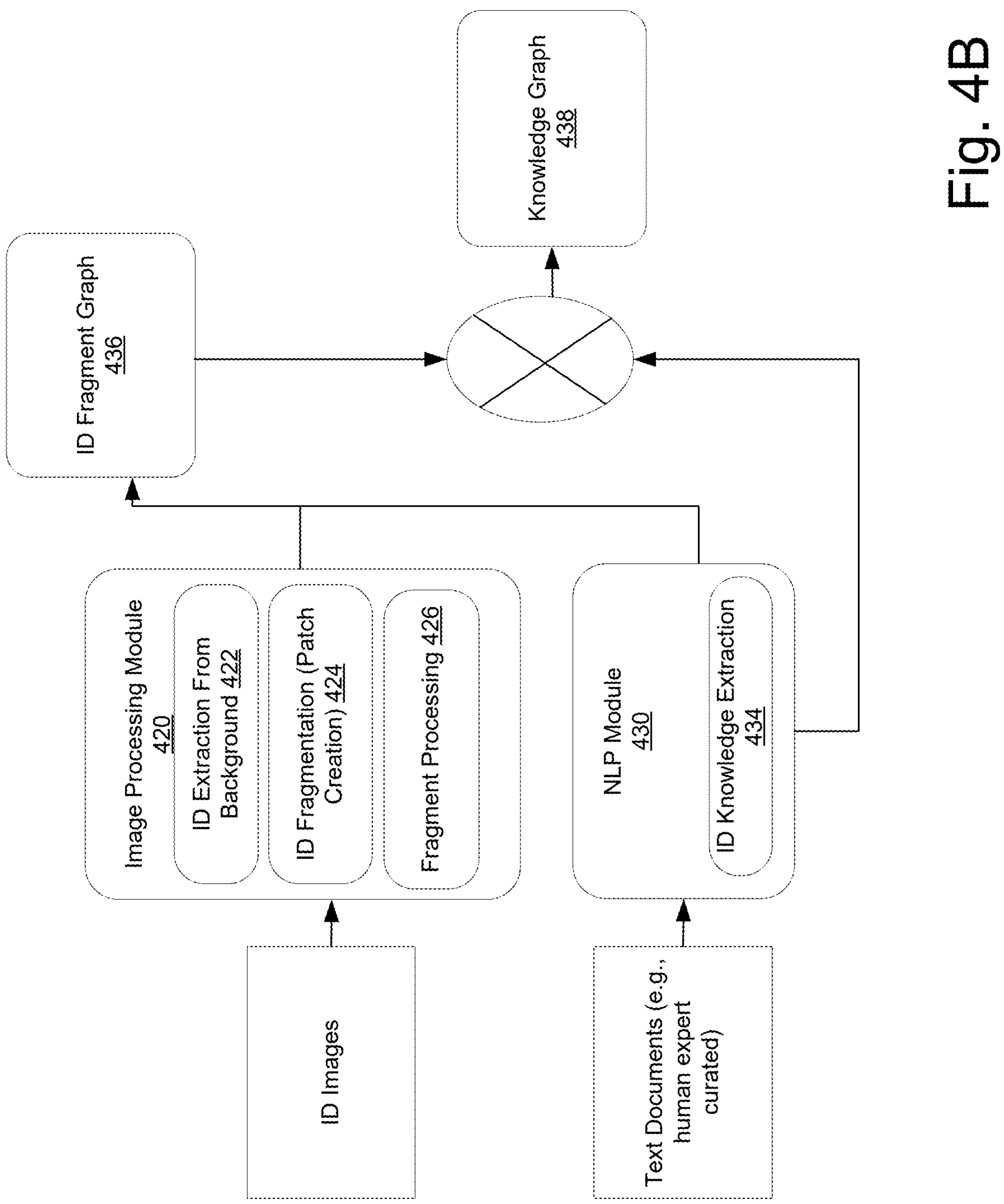
FIG. 4B is block diagram showing additional aspect of an example ID knowledge graph anomaly detector implementation in accordance with some implementations.

As illustrated in FIG. 4B, in one implementation, human expert knowledge is used to curate a multi-dimensional view of the Identification documents that results in a hierarchical multi-dimensional view of the various IDs and types that need to be learnt. Some dimensions that could be added are ID Type, ID Class, issuing body, issue period, issued population size etc. The result is a hierarchical graph structure. In one implementation, image processing module 420 separates the image of the ID from its background in the ID extraction module 422. The ID fragmentation module 424 in the image processing module breaks down an image into a set of image fragments Fragment process in performed in block 426.

A natural language processing (NLP) module 430 performs ID knowledge extraction 434 of human-curated text documents.

An ID fragment graph 436 is created. The ID Knowledge Graph 438 is built from a set of ID images and a set of text documents that provides information about the different IDs, their classes, and versions. Human curation of the knowledge graph is achieved through adding information in the form of a text document. While not illustrated in FIG. 4B, as previously discussed, a reasoning module powered by a combination of causal reasoning and neural networks may be used to build up the knowledge graph and build a decisioning module that detects anomalies within images of IDs. In one implementation, a reasoning module takes the information from the knowledge graph and builds a set of reasoning rules that check for invariance on multiple dimensions and validates these.

Figure 4C:
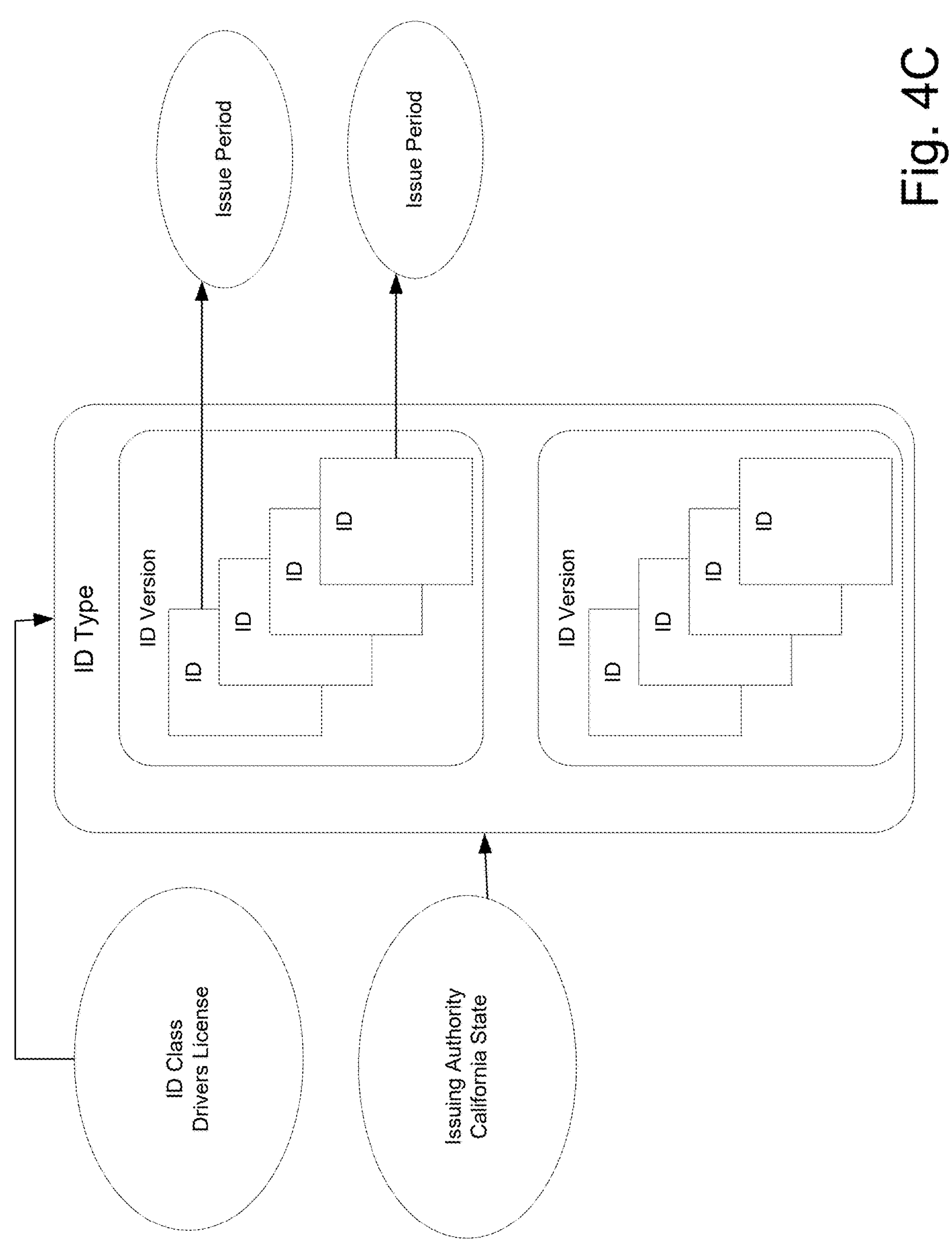
FIG. 4C illustrates an example of a multidimensional view of an ID, such as a Driver's License, in in accordance with some implementations.

FIG. 4C shows a simplified view of the multidimensional view of identification documents. In the diagram below we can see that there are different attributes for a given ID type; there could be different versions of the IDs released by the state that are effective for different periods of time. This can be implicitly inferred from the data on the IDs themselves. Similarly, information such as Issuing authority, population sizes etc. can be learnt from other unstructured sources. While FIG. 4C illustrates an example for a driver's license, the approach may be extended to other types of IDs, such as passport IDs or other photo IDs.

ID Anomaly Detection Using A Knowledge Graph Schema

Figure 4D:
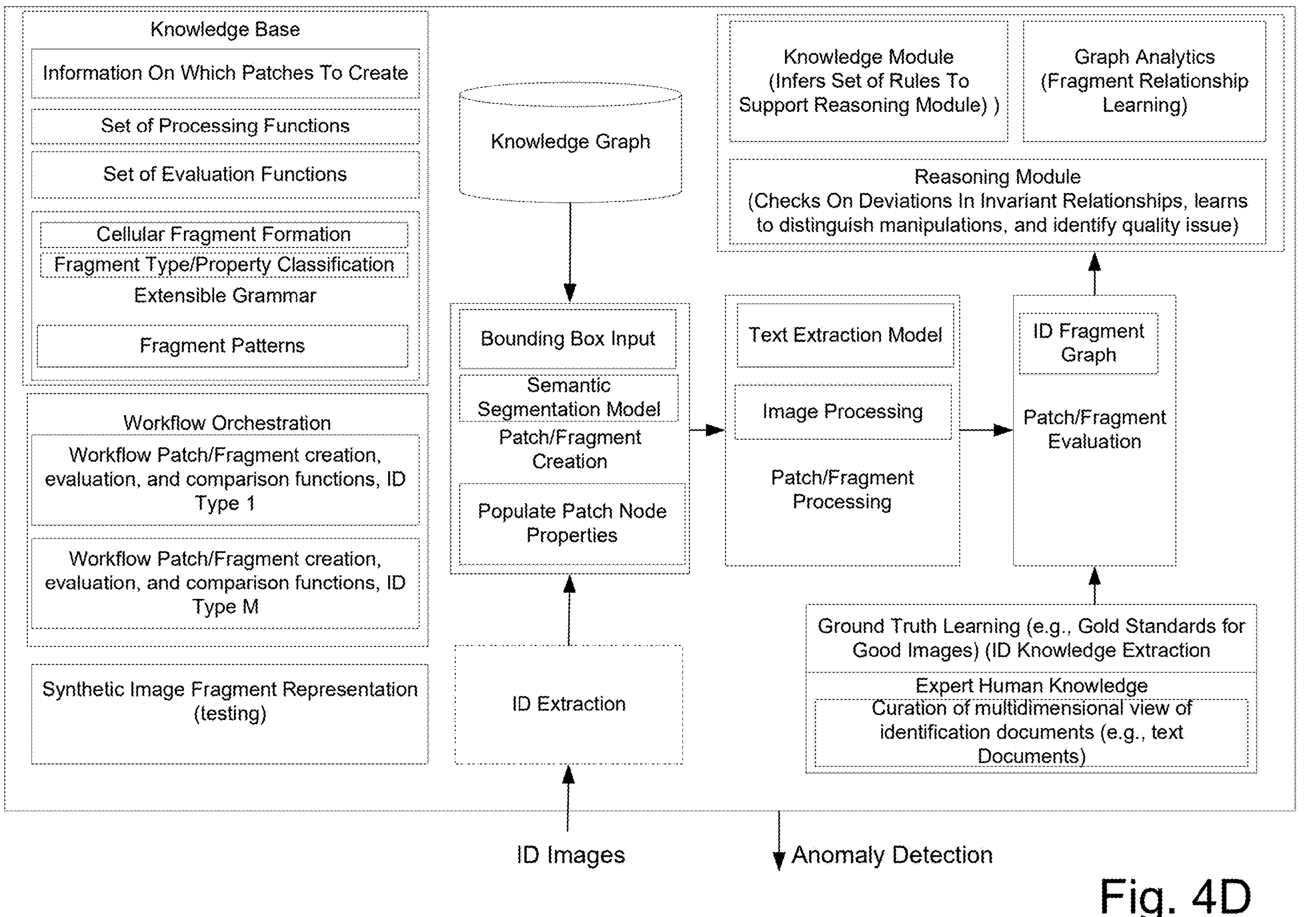
FIG. 4D is a block diagram of another example of an ID knowledge graph anomaly detector implementation in accordance with some implementations.

FIG. 4D is a more detailed version of the drawing of FIG. 4A. A system for implementing ID anomaly detection using a knowledge graph schema may include many different components, depending on implementation details. Some examples will now be discussed.

In one implementation, an extensible symbolic grammar is used to represent and learn the properties of image fragments such as spatial, colorific and language translations. The grammar may support fragmenting an image into cellular fragments and classifying/categorizing the fragments into different types and support identifying patterns in the fragments.

In one implementation, a synthetic anomaly insertion module is included to generate and insert anomalies into ID images and fragments.

In one implementation, support is provided for image fragment representation for multiple image types and versions.

In one implementation, graph analytics are used to learn the relationships between different fragments of the same image and between the same fragment of different images of the same id along the dimensions of space, color, time etc.

In one implementation a knowledge module takes the learnt relationships into an inferred set of rules for supporting a reasoning module.

In one implementation, a reasoning module checks for deviations in the invariant relationships and learns to distinguish between obvious manipulations by fraudsters and identifies. quality issues.

A knowledge graph schema permits graphs (or sub-graphs) of a knowledge graph to be used to detect anomalies in a 2-dimensional structure of a document. The patches are evaluated against an expected gold standard of good images. In some implementations this includes creation of the fingerprints of one or more sub-graphs, converting the fingerprints into vectors, comparing the vectors for similarity, and then identifying the sub-graphs for discrepancies and evaluating the risk associated with the discrepancy. Additionally, the discrepancies may optionally be categorized, such as categorizing the anomaly as a fraud, a lighting issue such as glare, or other image quality issues.

The system may include a graph database for persisting function calls and orchestration of workflows. The knowledge base may include a gold standard to compare the results against what is expected.

In one implementation, a knowledge graph is used to evaluate if the image of an ID is for a genuine ID or a fraudulent ID. Every identification document of a particular type and version has a certain set of variant and invariant features that are common across all ID documents of that particular type and version. For example, a driver's license from a particular state and for a particular version has a set of variant and invariant features found in other driver's license from the same state and the same version.

In one implementation, identification of fraudulent IDs requires paying close attention to various sections of the IDs and looking for deviations from an expected pattern within the variant and/or invariant feature.

For a given ID type and version, the knowledge base includes information on what patches to create; a set of processing functions necessary for extracting actionable information from each of these patches; and a set of evaluation functions to evaluate the results of the processing functions, either with other results stored in the knowledge base or by comparing the results of multiple processing functions. In one implementation, the knowledge graph implementation also stores the orchestration of various functions namely patch creation, evaluation, and comparison functions for various purposes in a DAG (Directed Acyclic graph).

The knowledge graph architecture includes knowledge graph, a set of patch creation functions, a set of patch evaluation functions, a set of patch comparison functions and a workflow for orchestration of these functions for a given ID type.

In one implementation, the knowledge graph anomaly detection architecture allows the re-use of existing deep learning models, and expert knowledge is organized in a manner that allows for parallelized processing and evaluation of millions of images of thousands of types, processing them efficiently by focusing on select areas of the image, evaluating the output of the processing functions with a combination of expert knowledge, deep learning models and in built expertise in expensively using a serverless architecture that can scale to any size of image volume on a cloud infrastructure with linear cost scaling proportional to the number of images and the complexity of the associated processing and evaluation functions.

Figure 5:
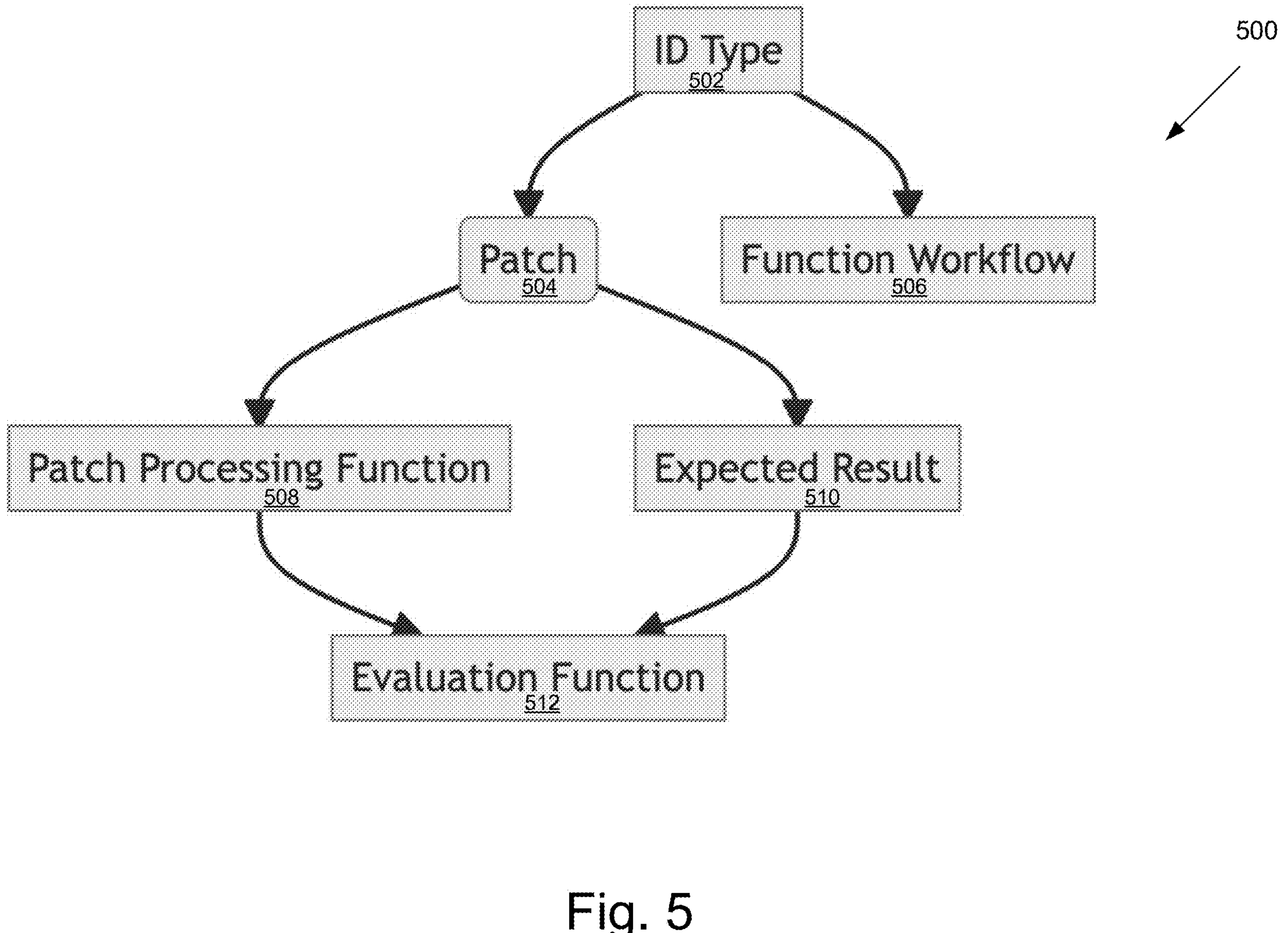
FIG. 5 illustrates an example of knowledge graph schema in accordance with some implementations.

One aspect is that the knowledge graph has an associated graph schema, which may be ID type centric to support different types of IDs, such as different types of driver's licenses as an illustrative but non-limiting example. An example of a knowledge graph schema is illustrated in FIG. 5. In one implementation, the knowledge graph schema 500 is an ID type centric schema. In one implementation, it includes the following Node Labels (types) and the associated relationship types. Node Labels:

1. IDType 502;
2. Patch 504;
3. Workflow 506;
3. Patch Processing Function 508;
4. Expected Result 510; and
5. Comparison Function 512.

In one implementation the schema 500 includes the following relationship types:

1. IDType→Patch;
2. Patch→Patch Processing Function;
3. Patch Processing Function→Comparison Function; and
4. IDType→Workflow.

An example of patch creation function will now be described. In one implementation, the patch creation function creates the patch and also populates the patch node with properties such as an invariant information, variant information, and security feature(s), and patch importance.

In one implementation, patch creation functions use deep learning models (semantic segmentation), if necessary, to identify sections of the image where there is a certain type of image. If the ID classification is presumed to be correct then bounding box co-ordinates stored in a document database may be used.

In one implementation, the patch creation function will take as an input the bounding box parameters or, alternatively, a semantic segmentation model that outputs a segmented bounding box of a portion of the image.

An example of patch processing functions will now be described. In one implementation, a patch processing function can use a text extraction model. A feature engineering technique that can be used vectorize an image patch. Other patch processing function may include other image processing functions such as a color histogram, thresholding function etc.

In one implementation, at least two different types of patch processing functions are supported. The patch processing functions could be of several types, including for example:

Identify if the patch has a face (a facial image)
Identify the font type
Identify the font color
Identify the base alignment of the text
Extract text Subtract text or other variant information and extract background Convert a face to a vector in high dimension space Create a bar code from an image using topological metrics Convert an image or a processed image into an embedding vector etc.

In one implementation, the patch processing function will take as input the output of a patch creation function and will provide an output in a JavaScript Object Notation (JSON) format.

Examples of evaluation functions will now be discussed. In one implementation, an evaluation function takes, as an input, the output of one or more processing functions and then evaluates these results with a known result or by some mathematical comparison of the results obtained from the different processing functions to identify inconsistencies or anomalies.

As an example of a simple evaluation function, perhaps the simplest evaluation function is to check if the bounding box co-ordinates of an expected image are within the tolerance levels (based on examining hundreds of non-fraudulent images). Other evaluation functions could be comparing an image vector with a vector in the database, comparing the font type with an expected font type etc.

In one implementation, the evaluation function will take as an input the outputs of one or more processing functions and optionally some ground truth values and thresholds to compare these outputs with.

An example of an orchestration workflow will now be described. In one implementation, each ID type will have an orchestration workflow which will be the execution sequence of the various functions associated with the ID type. In one implementation, the workflow itself will be stored as a JSON property that relates to the various patch creation, patch processing and evaluation functions.

Driver's License Example

Figure 6A:
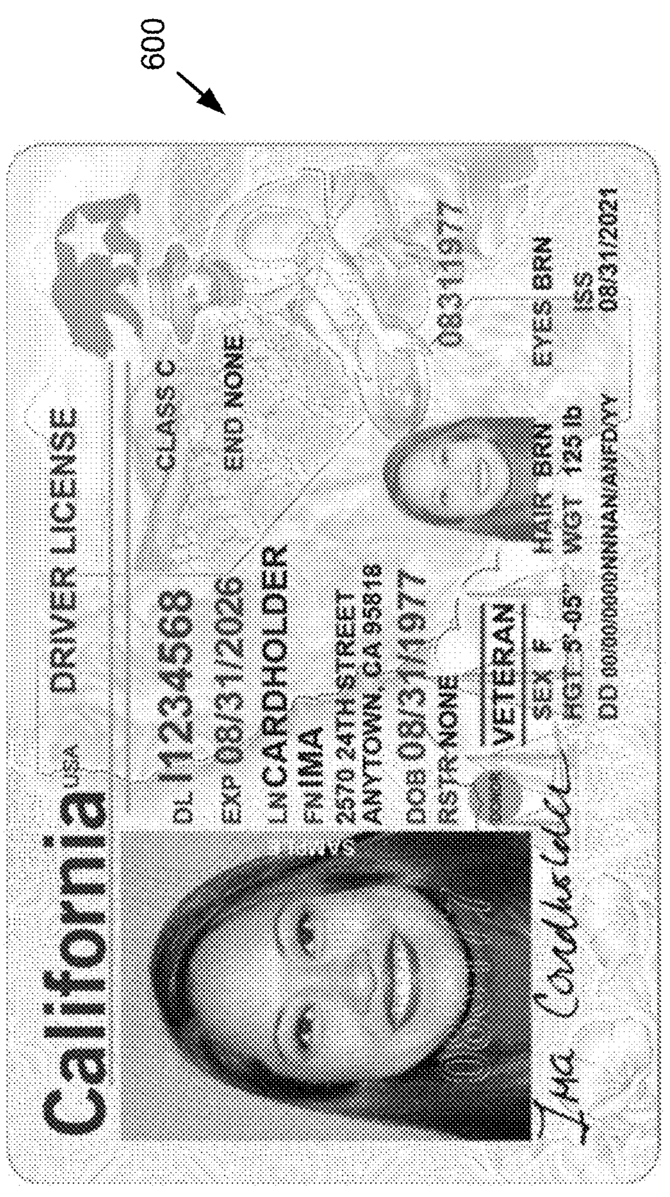
FIG. 6A is an image of an example of a California Driver's License, which is an example document in accordance with some implementations.
Figure 6B:
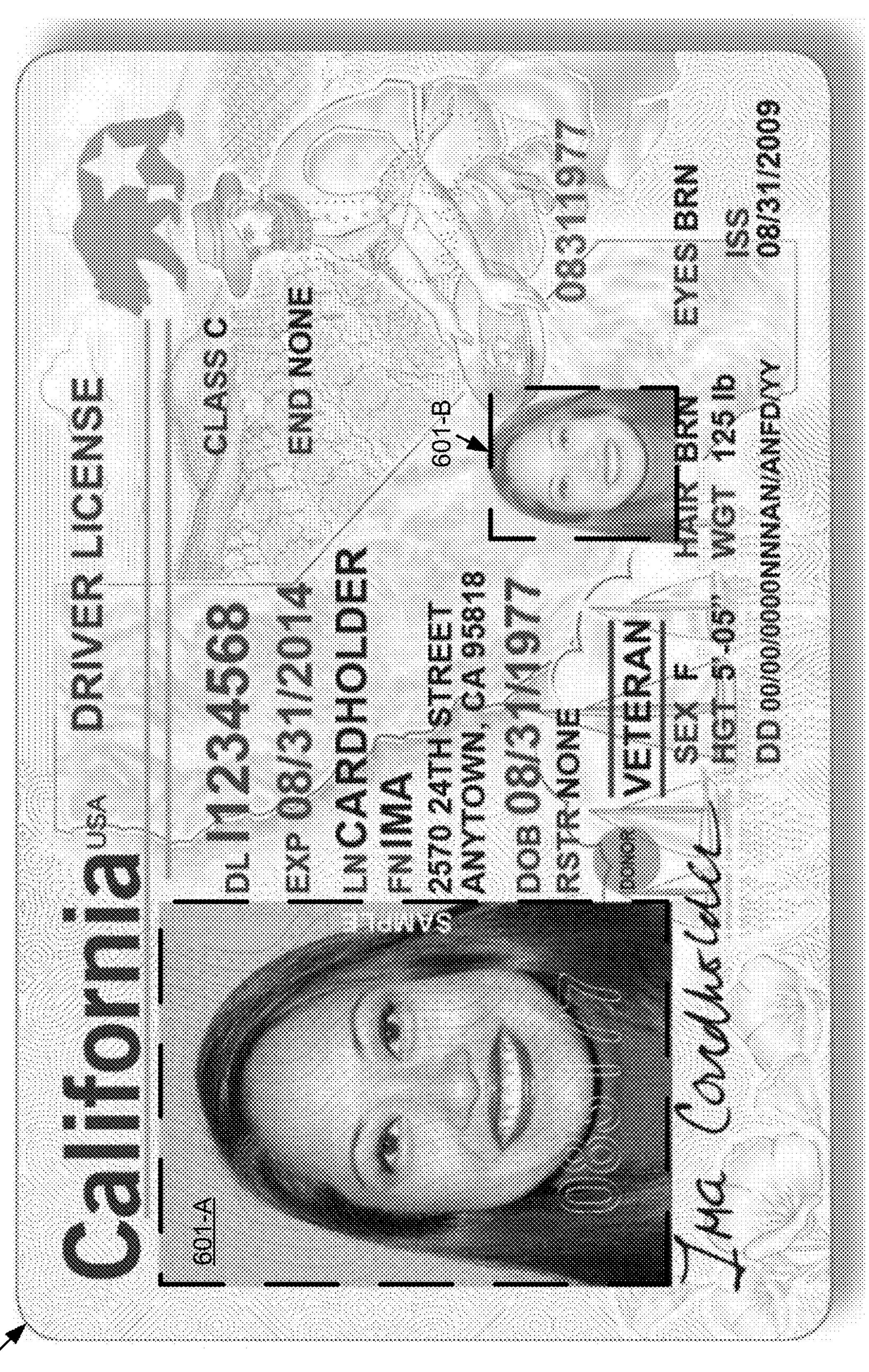
FIG. 6B is an image of the example California Driver's License with examples of bounding boxes superimposed in accordance with some implementations.
Figure 6C:
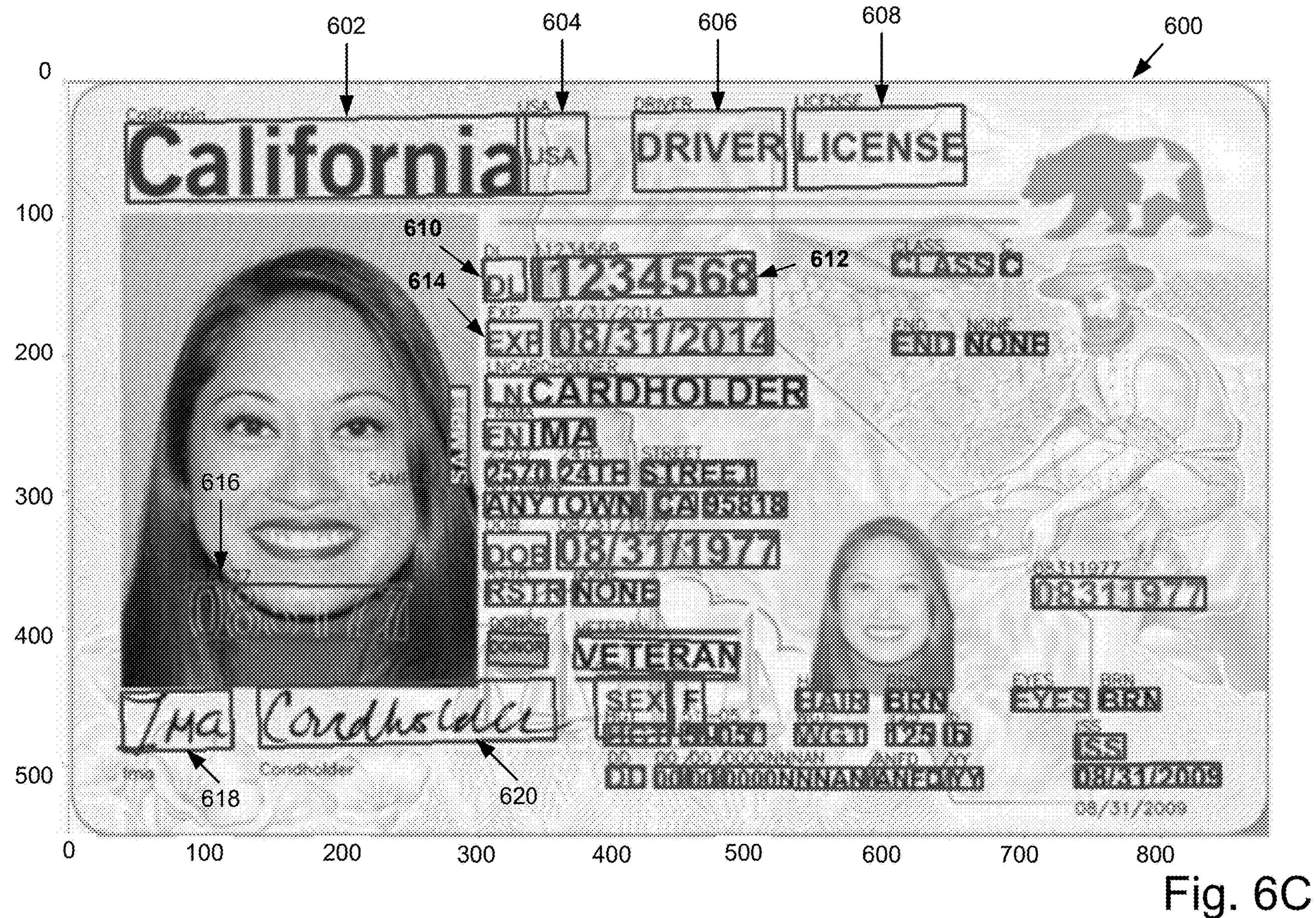
FIG. 6C is an image of the example California Driver's License with examples of bounding boxes superimposed in accordance with some implementations.
Figure 6D:
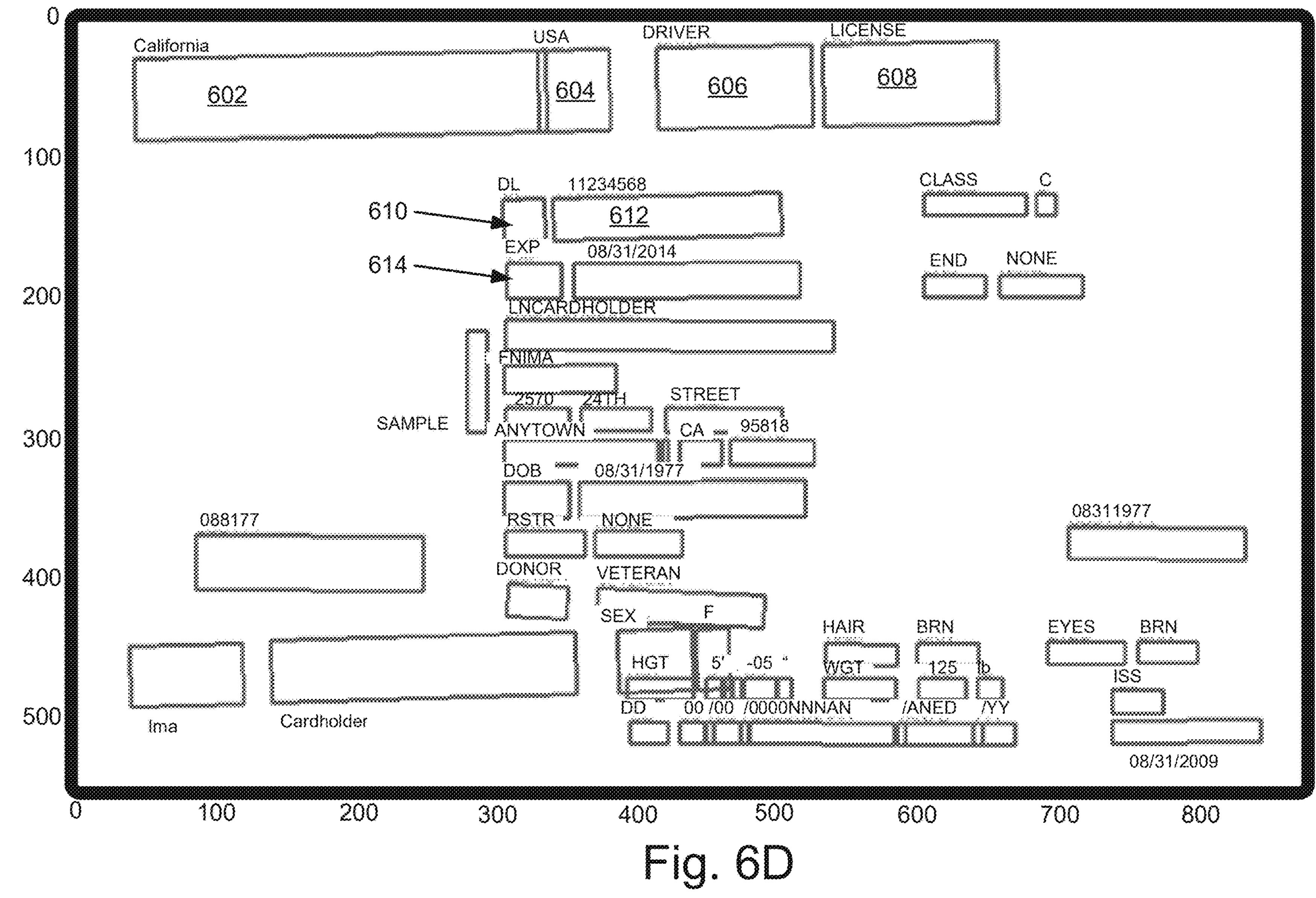

FIG. 6A shows an example of a California driver's license 600 as an illustrative but non-limiting example of an ID. As illustrated in FIG. 6B, the California Driver's License has facial image sections 601-A and 601-B, which are illustrated with bounding boxes illustrated that may include for example section like section 602 for the California section of the image, section 604 for the USA section, section 606 for "Driver", section 608 for "license, a DL section 610, an ECp section 614, signature sections 610 and 620, and an additional text section 616 superimposed in a photo image as a security measure. As illustrated in FIG. 6C, the drivers' license also has variant and invariant sections. The corresponding bounding boxes are illustrated in FIG. 6D. FIGS. 7A, 7B, 7C, 7D, 7E, and 7F illustrate examples of patches extracted.

In one implementation image would then be split into several patches, including variant patches and invariant patches. For example, for an ID type being a California Driver's License, the patches may include:

Image Patches;

Full License Image;

California License;

Invariant License Header Patch;

Invariant License Header;

Variant Name Patch;

License Holder's Name;

Variant Number Patch;

Driver's License Number;

Variant Date of Birth Patch;

Date of Birth—1;

Variant Redundant Date of Birth Patch;

Date of Birth—2;

Variant Redundant Date of Birth Patch; and

Date of Birth—3.

In this example, the patch properties have the following properties:

1. Bounding Boxes;
2. Bounding Shape;
3. Fraud Propensity;
4. Robustness for ID type identification; and
5. Feature Vectors of Ground truth.

In this example, the patch processing functions include:

1. Text Extraction;
2. Visual Encoding with DL (Deep Learning) Models (e.g., Data2VecVisionModel);
3. Encoding with Topological data analysis (TDA); and
4. Simple metrics like color histograms and threshold values.

In one implementation, examples of patch evaluation functions include:

1. Text Comparison Function;
2. Visual Encoding vector comparison with threshold ground truth vector distance;
3. Topological data analysis encoding comparison with threshold ground truth-distance metric; and
4. Comparing distributions of the color histogram.

Additional Examples

As previously discussed, one aspect of the ID anomaly detection is that a two-dimensional arrangement of patches and associated patch properties may be evaluated and used like a fingerprint and compared with a gold standard, as previously discussed.

Additional examples will now be discussed with regards to FIGS. 8, 9, 10, 11, 12, and 13. ID verification may include analyzing image including images of scans (e.g., scans of photo IDs) and selfies (live photos of a user. These images are broken down into patches/fragments and there are basically two types of patches/fragments: image fragments and symbolic fragments.

Examples of image fragments include facial fragments, fingerprint fragments, and ID fragments. Examples of symbolic fragments include identity fragments, channel fragments, and context fragments. Identity fragment may include name, date of birth, nationality, document number, identity (e.g., a social security number or equivalent number for different countries). Channel fragments include device and IP address. Context fragments include merchant, time, and ID type.

One aspect of ID Anomaly detection is building a knowledge base of how a genuine ID looks like. To do this image broken the image into fragments of variant and invariant types. In one implementation, anomaly detection is performed against a global golden archetype that contains invariant security features.

Figure 8:
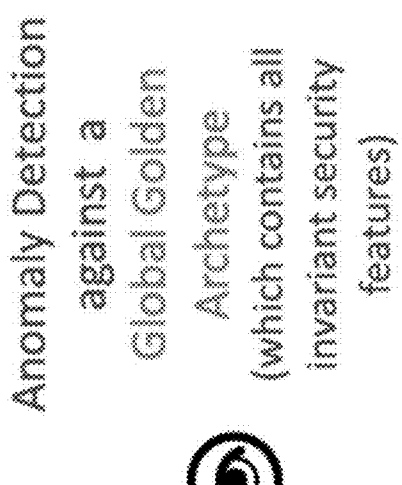
FIG. 8 illustrates an example of anomaly detection for invariant features in accordance with an implementation.
Figure 8:
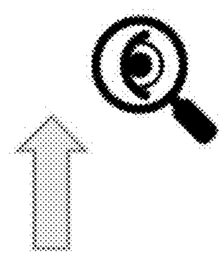
Figure 8:
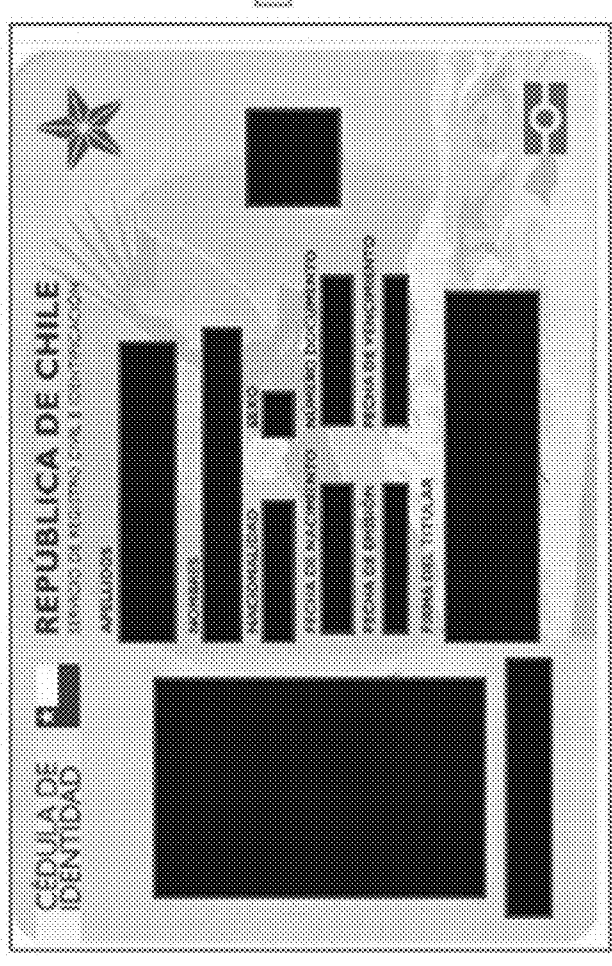

Referring to FIG. 8, in one implementation, an image if formed where all of the variant features are greyed out and then all of these masked images are compared for three types of features: spatial features, color features, and shape features.

Figure 9A:
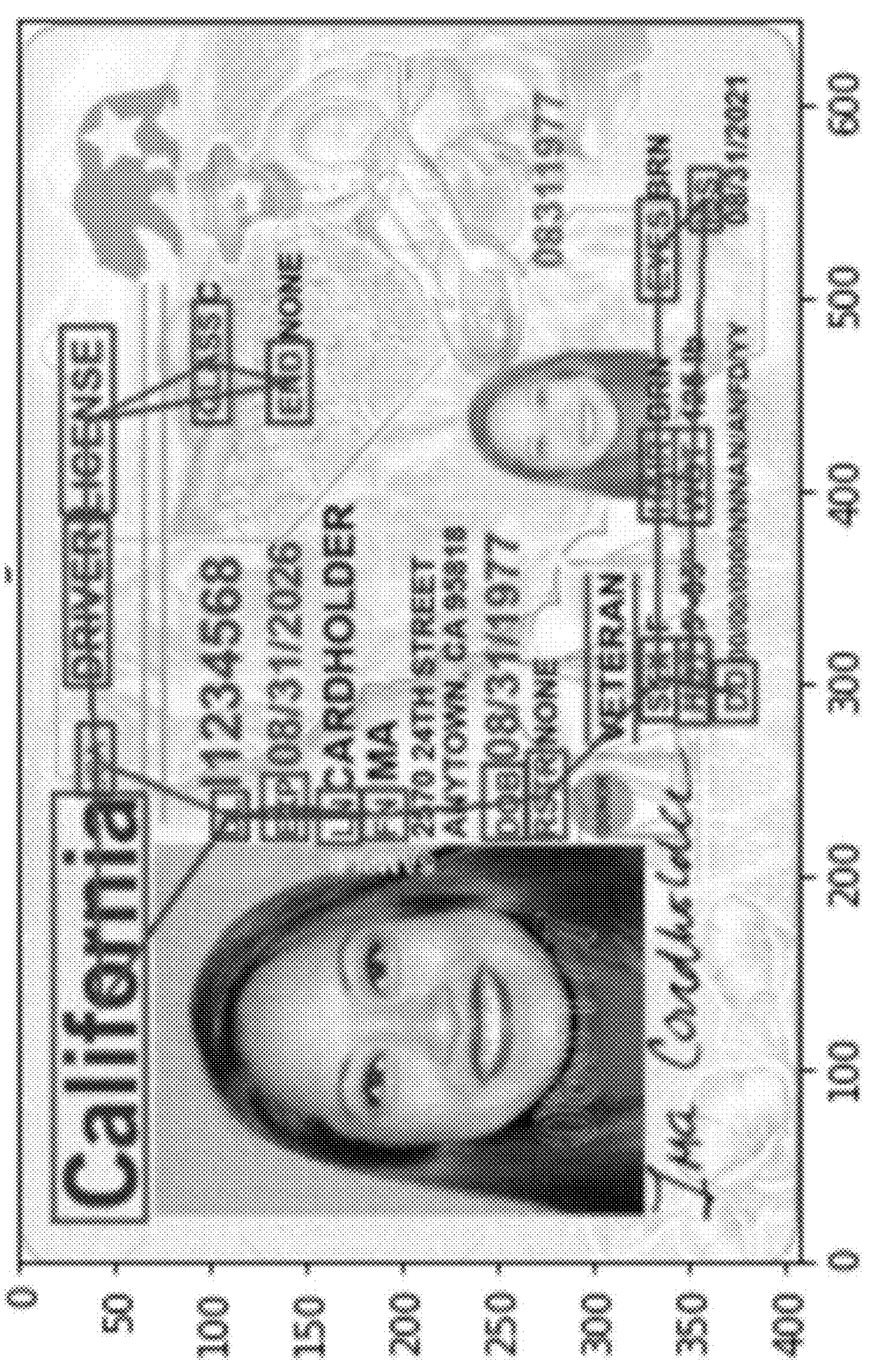
FIG. 9A illustrates spatial relationships in invariant patches of a California Drivers' license in accordance with some implementations.

FIG. 9A illustrates an example of spatial features. In FIG. 9A, the system analyzes the invariant portions of symbols like California/Driver/License/DL/EXP etc. as bounding boxes. An example set of bounding boxes is illustrated superimposed on the drivers' license. For the purpose of illustration, additional lines are illustrated connecting the bounding boxes of invariant portion to illustrate that a graph can be generated that captures not only where these boxes are located but how they are located in relation to each other providing a fingerprint of the spatial relationships.

Figure 9B:
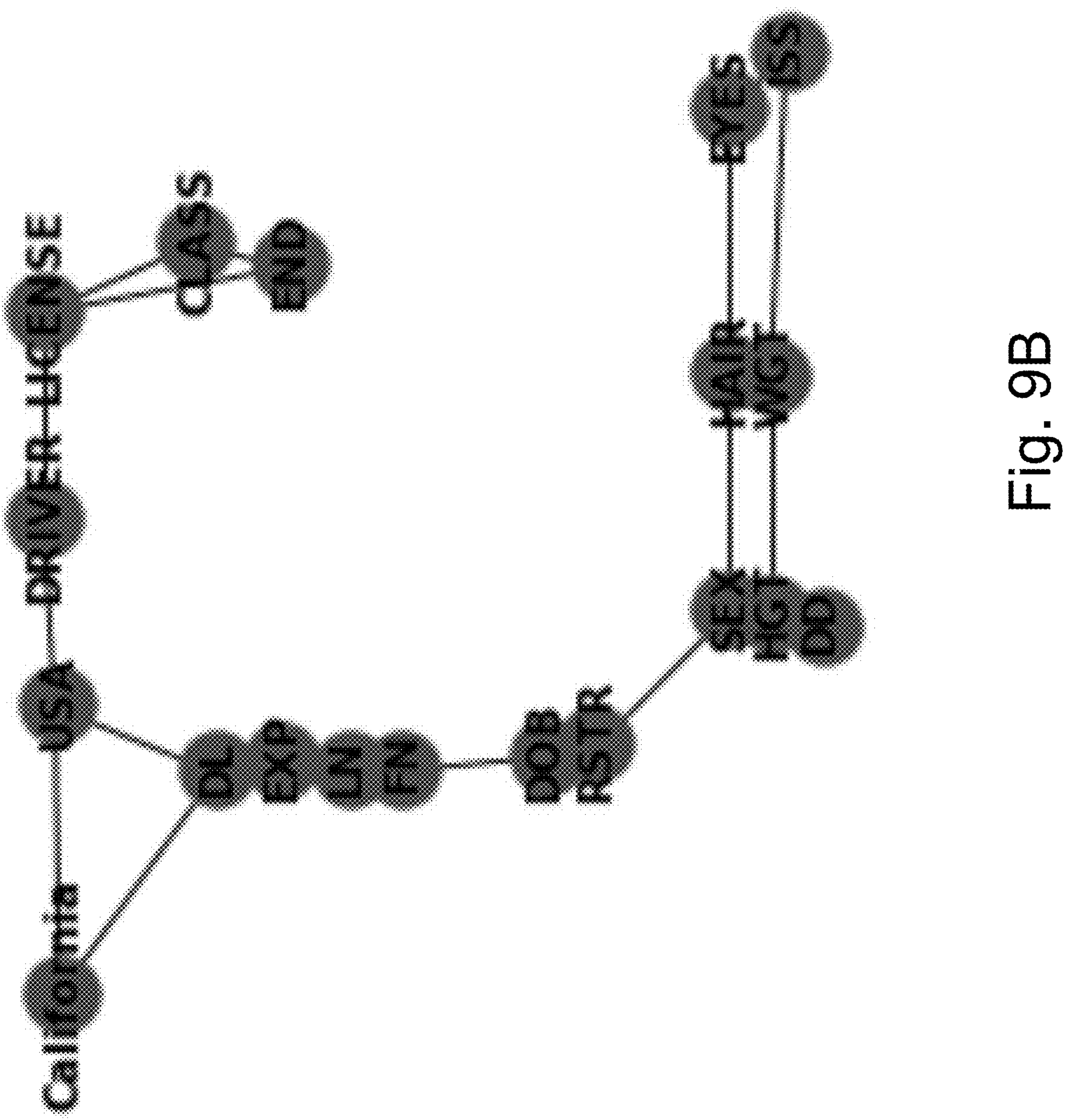
FIG. 9B illustrates spatial relationships in invariant patches of a California Drivers' license in accordance with some implementations.

FIG. 9B illustrates aspects of a fingerprint of FIG. 9A based on the spatial relationships. In one implementation, when capturing the spatial relationships, each bounding box has a set of coordinates that represent the center of the bounding box and the area of the bounding box. The relationships can be dynamically assessed based on the distances on the 2-dimensional ID space between the different fragments. This results in a fingerprint of spatial relationships. These figures can be used to identify misclassified IDs as well as identifying fraud where the fraudster has modified portions of the ID which gets revealed in mismatched fingerprints with the golden ID fingerprint (an aggregation of fingerprints). With respect to text, the spatial features can not only compare the space between fragments but can also check for space within the symbols in an ID fragment that are targeted by fraudsters for manipulation.

Figure 10B:
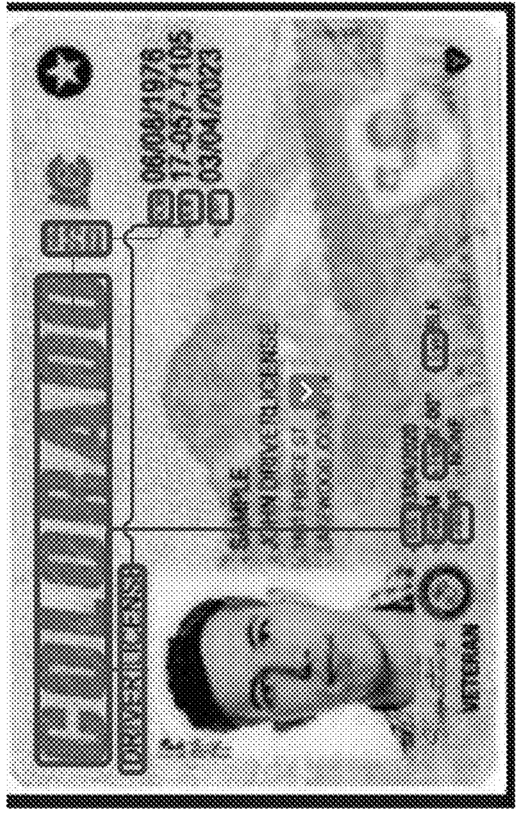
FIG. 10B illustrates spatial relationships in invariant patches of a Colorado Drivers' license in accordance with some implementations.
Figure 10A:
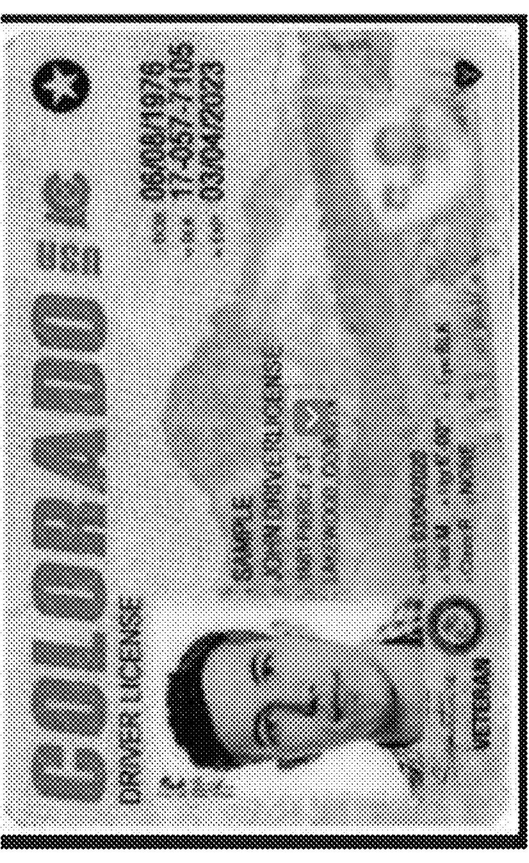
FIG. 10A illustrates a Colorado Driver's License.

FIG. 10A illustrates an example of a Colorado Driver's License. FIG. 10B illustrates the spatial relationships for a Colorado Driver's License. It can be seen that the spatial relationships are different than for a California Driver's License of FIG. 9B.

In one implementation, the color features of the invariant portions of the ID are captured. The captured actual color values can be used to identify the discrepancies within an ID revealing ID anomalies and also the region where the anomaly occurred. In one implementation, when looking for graph patterns the system looks for similar and dissimilar clusters of color from the similar and dissimilar clusters on the fingerprint ID. Dissimilar clusters within the same ID reveals manipulation/blur/glare and other quality issues even under different lighting conditions where the actual color values may be different but the similarity/dissimilarity between the different fragments is preserved.

In one implementation, shape features are analyzed. In one example, the shape features include shapes of characters and fine print within an image fragment with a set of golden ID image fragments. This allows for a faster comparison of multiple characters by using simpler shape comparison techniques and replaces comparison techniques like font check, height of the character check etc. and reveals even minute modifications done by a fraudster in terms of replacing characters, making subtle insertions or modifications and where it occurred on the ID.

Figure 11:
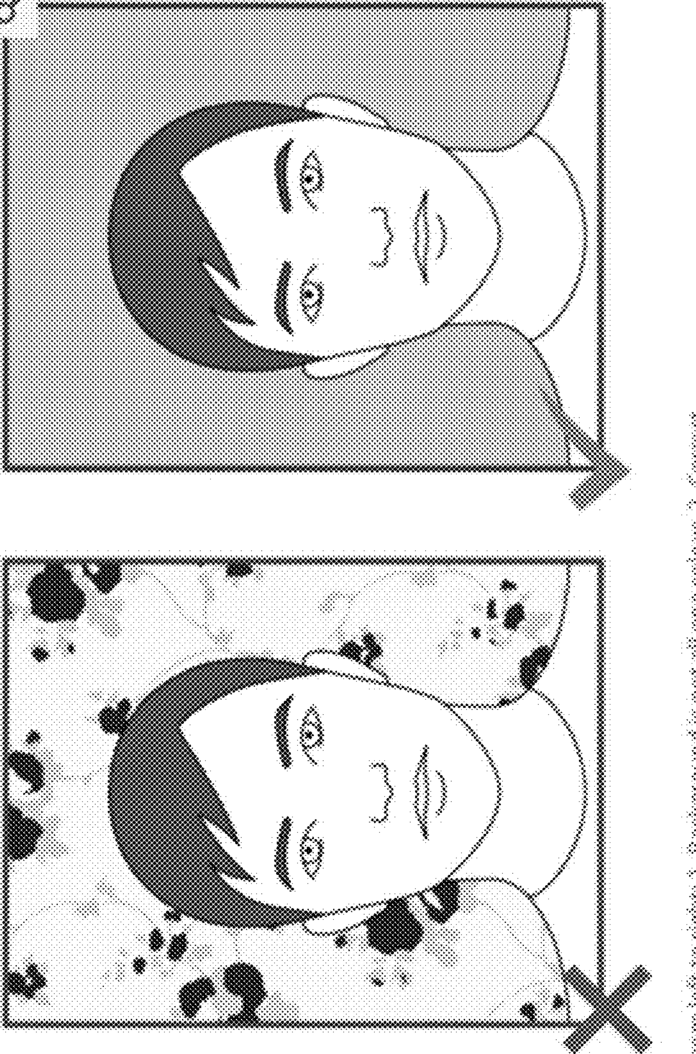
FIG. 11 illustrates an example of color features in accordance with some implementations.
Figure 11:

A combination of all of these features can be compared with knowledge gained from documents provided by the issuer an example of Netherlands photograph requirements is shown below:

In FIG. 11, the left picture has a background that is one color and thus is rejected. The photos on the right have a background of one color. This example assumes that the background of a photo must have a background in a limited selection of colors (e.g., light grey, light blue, or white), plain, all one color, all one shade, and contrast sufficiently with the head. This example reflects features associated with a valid ID photo for someone form the Netherlands.

Figure 12:
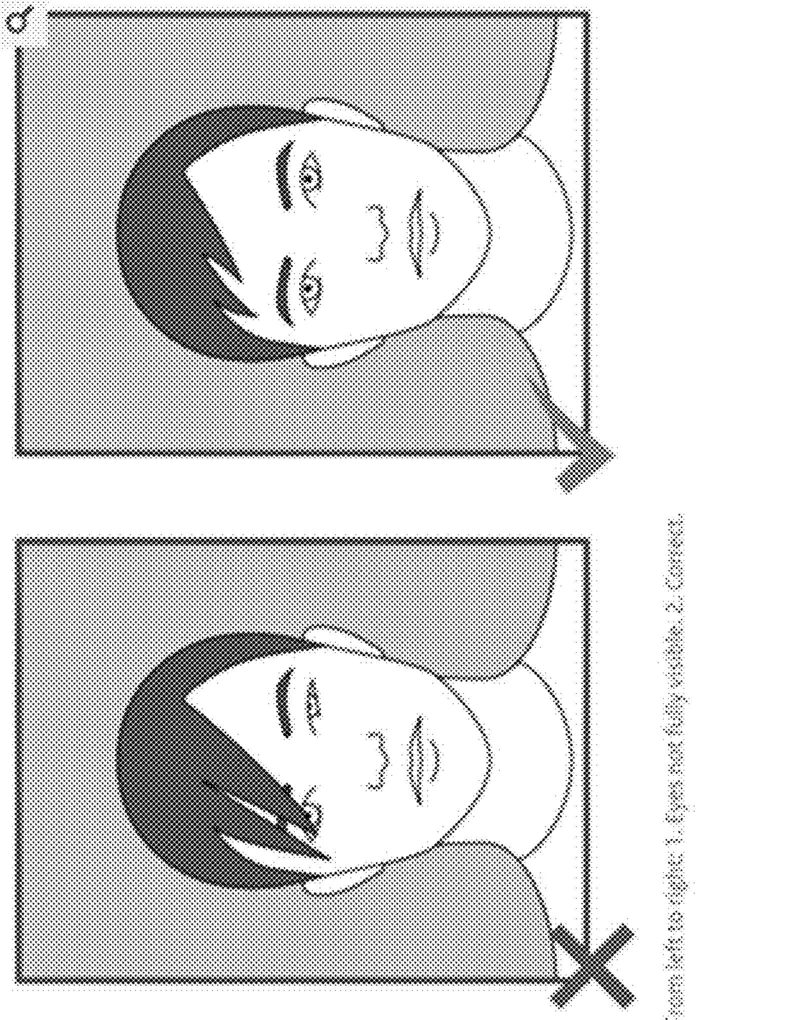
FIG. 12. illustrates an example of shape features in accordance with some implementations.

FIG. 12 illustrates an example of facial appearance. It assumes that the gold standard is that the head is uncovered, the face is fully visible, and the eyes are fully visible. The photo on the left fails because the eyes ae not fully visible.

Figure 13:
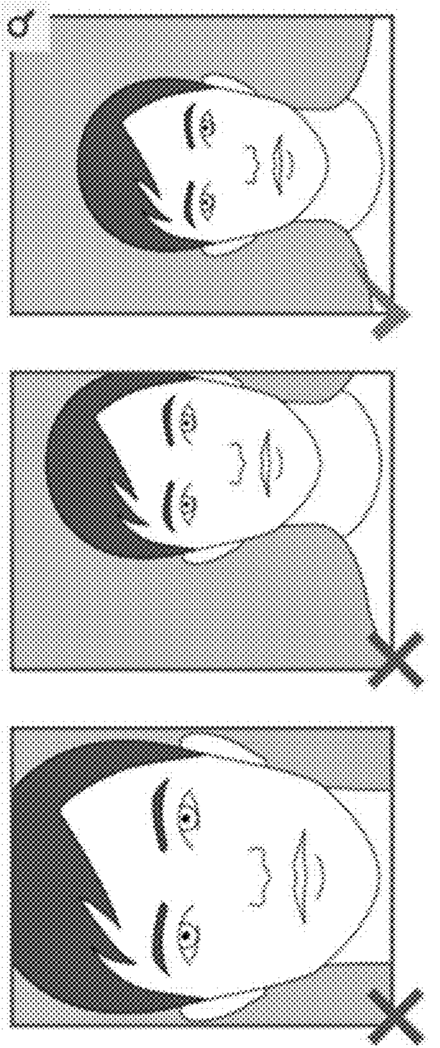
FIG. 13 illustrates an example of shape features in accordance with some implementations.

FIG. 13 illustrates an example for head framing in a photo. The head must be shown in full and the head centered. The left-most photo and the middle photo fail these requirements.

Example Methods

Figure 14:
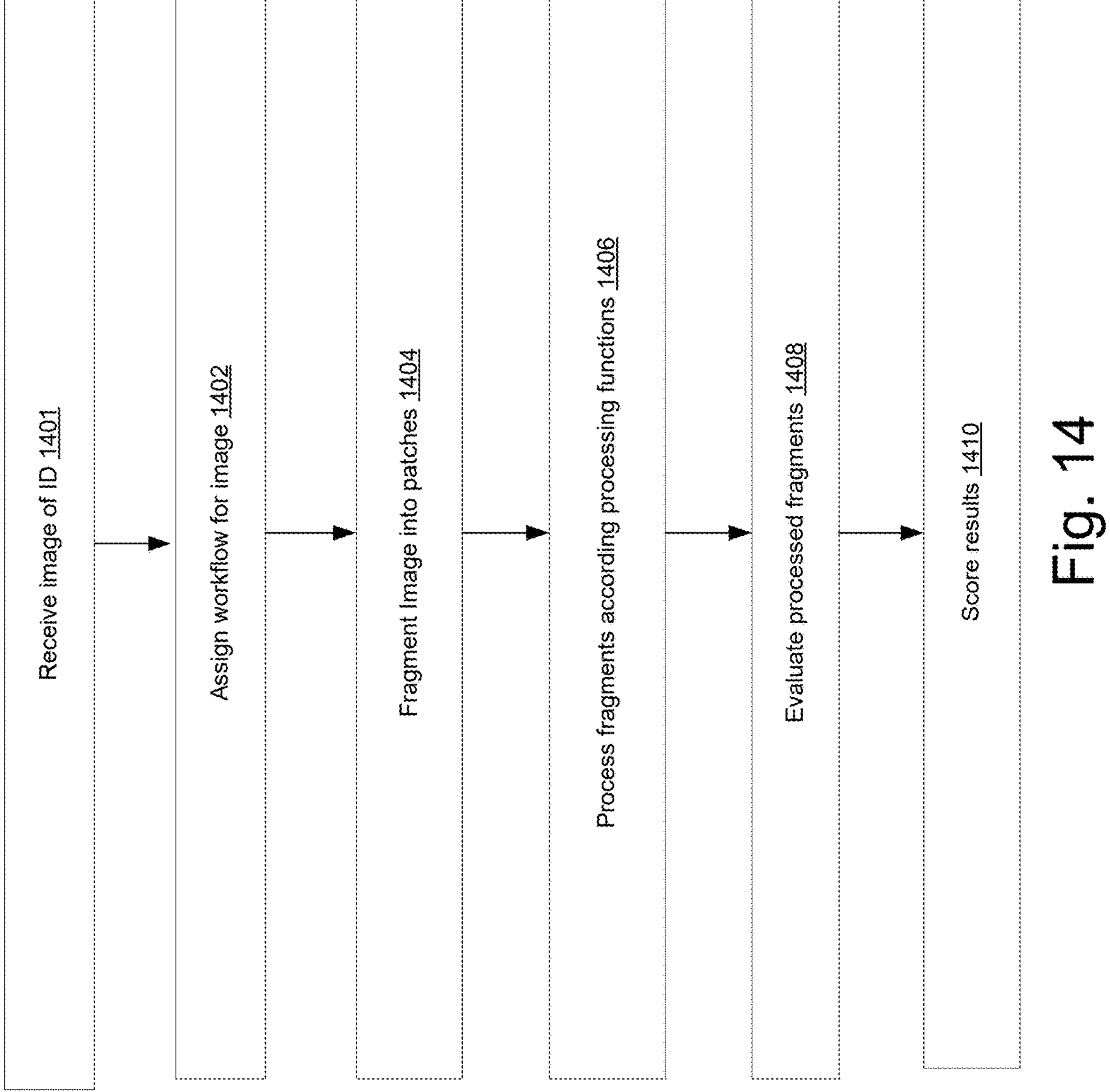
FIG. 14 is an example flow chart of a method in accordance with an implementation.

It will be understood that the previously described processing steps may also be expressed as method flowcharts. FIG. 14 is an example flowchart of a method. In block 1401, an image of an ID is received. In block 1402, a workflow is assigned based, for example, on the ID type and ID version, although other attributes of the ID could be used to select the workflow. In block 1404, the image is fragmented into patches/fragments. In block 1406, the fragments are processed according to processing functions. In block 1408, the processed fragments are evaluated. In block 1410, scoring of results is performed.

ID Anomaly Examples

In one implementation, the ID knowledge graph anomaly detector 130 identifies and categorizes anomalies in ID documents. In one implementation, the ID knowledge graph anomaly detector 130 takes an image of an ID document and its corresponding class label as inputs. The class label represents the recognized class of the ID, such as a passport of a particular country (e.g., a Spanish passport) or a drivers' license of a particular country (e.g., a UK regular driver's license or a California Driver's License). The ID knowledge graph anomaly detector 130 then identifies three types of anomalies: a Class Anomaly, an Image Anomaly due to Quality, and an Image Anomaly due to Fraudulent Manipulation.

A Class Anomaly relates to incorrect labeling of the ID image. The anomaly detector not only identifies the incorrect label but also pinpoints parts of the image that deviate from representative IDs stored in its knowledge base 314, thereby providing a visual justification for the anomaly.

Image Anomalies, on the other hand, occur when the recognized class of the ID is correct, but parts of the ID document image have anomalies. These anomalies can be due to poor image quality caused by factors like glare or over-exposure, or due to fraudulent manipulation, such as altering text elements or the human face on the document image.

An exemplary application for the ID knowledge graph anomaly detector 130 is in system evaluating IDs that handles many different ID types, including IDs from different countries (e.g., thousands of ID types from various countries). Deep Learning models may be used to make decisions, but it is hard to test Deep Learning models without human intervention. In addition, the images are captured by a wide range of cameras and the quality of image capture is suspect. For example, in one exemplary system, a large number of images are processed each day in a ML a pipeline in which there are both classification errors and image anomalies that include quality anomalies in addition to fraudulent manipulation of the images. And sometimes combinations of these problems can occur together.

The ID knowledge graph anomaly detector 130 has applications such as a testing and validation tool for decisions made by the deep learning model. In one implementation, it employs a part-whole hierarchy mechanism akin to human intuition to assist human analysts in detecting fraud. This mechanism allows analysts to focus on small details of a fraudulent document, enabling a reinforcement loop that guides a secondary model to learn where and how to look at an ID image document. There are limitations to the deep learning models used for identifying the class of the label. These deep learning models require extensive human labor for testing and are costly to implement. Moreover, with thousands of different types of document IDs, the learning space for these models is vast, which can lead to over-learning some IDs and under-learning others.

One of the problems in a large-scale ID identification system is the class identification problem. For example, consider as a hypothetical example a multi-class identification with over 5000 ID types and one driver's license model. This would mean that are many more ways of being wrong than right (e.g., 4999 ways of being wrong and only one way is right). Having a method to test a deep learning visual model is thus a useful feature. In one implementation, the ID anomaly detector generates information to provide explainability of errors and a means to classify the errors. In one implementation, an automated learning mechanism of what parts of the ID are important. Multi-class deep learning models that label images are hard to test and require a human expert to tag the errors and validate the results. This invention can provide an automated means to identify class identification errors and also provides explainability on which part of the ID is deviant from the expectation of all images of a particular ID class. Photographs of ID images vary in quality and quality issues cause problems with extracting information from the ID such as name, document number (passport, DL number etc.), address, date of birth. Identifying quality issues and identifying the parts of the ID image where the quality issues are found can be an important factor that allows for rejection of the image or some of the extraction results. ID images can be manipulated by manipulating portions of text in the image. ID images can be manipulated by manipulating portions of the faces in the image. ID images can be manipulated by copying and pasting text from another image.

In one implementation, a visual grammar, which is described below in more detail, is used to represent knowledge about how an image of a specific ID class looks like. The use of a visual grammar aids in identifying the anomalies quickly and accurately.

In one implementation, every image is a rectangular image and can be broken down into small cells. In an example implementation, every rectangular image is broken down into cell sizes with an area of 4 to 16 square millimeters which have a row number and column number to provide the position. The cellular image fragments can be combined to form larger fragments that fall into three categories:

1) Text Fragments
2) Describable image fragments
3) Non-describable image fragments.

In one implementation, a special type of image fragment is an image fragment formed by applying a masking function to an existing image or image fragment.

In one implementation, the fragments themselves have a variety of properties that allows for comparison of these fragments.

In one implementation, the knowledge graph is built using a sample of very high-resolution images of exceptional quality, good quality images and a few fraudulent images and low-quality images,if available. These images are broken up into fragments and their properties are derived using the various patch processing functions. This data is stored in the knowledge graph. When a new image comes in using the knowledge base 314 the same patches are created and then compared with the knowledge graph as well as with fragments of other scans within that ID class. This allows for identifying invariant and variant anomalies that are not expected.

In one implementation, the ID knowledge graph anomaly detector 130 has dual uses. First, it may be used for testing and validating deep learning models that perform classification tasks on images belonging to a narrow but reasonably large space like ID documents which can be passports, driver's licenses, ID documents by various countries, states and for various purposes. Second, the ID knowledge graph anomaly detector 130 may be used for making anomaly decisions by zooming into an image and then providing the zoomed areas (fragments) of the image as evidence of the anomaly as compared to a ground truth image.

Visual Grammar and Cellular Fragments

In one implementation, the visual grammar has several different aspects. The first, as previously discussed, is the use of cellular fragments. The visual grammar breaks an image down into image fragments, referred to as cellular fragments. These cellular fragments may be categorized into different categories.

The formal grammar breaks down every ID image into small image fragments, referred to as cellular fragments. These fragments are then aggregated into subsets, creating three categories: Text Fragments, Describable Image Fragments, and Non-describable Image Fragments. These patterns are further classified into Variant Image fragments and Invariant Image fragments, depending on whether they differ or remain the same across all ID images of the same class.

In one implementation, a special type of image fragment called a negative fragment is obtained by subtracting portions of the image using a masking function. The process of building these image fragments involves human knowledge and deep learning models to identify Text and Image fragments for an ID class and to create masking functions.

In one implementation, the cellular fragments are further organized into positive and negative fragments. Positive fragments correspond to portions of an image. Negative fragments are fragment obtained by subtraction. For example, a negative fragment may subtract a portion of an image, such as subtracting a face from a photo, subtracting an entire ID image from a photo, or subtracting other selected portion from an ID image.

The fragments can also be categorized in terms of higher order fragments including text fragments, describable fragments, and non-describable fragments. Text fragments include variant text fragments and invariant text fragments. Describable fragments include invariant fragment but can also be variant in some cases, such as for photo. Non-describable fragments may include invariant fragments.

Some examples of fragment properties include color properties (e.g., Color histogram, Area of the dominant color); matrix properties/bar codes; embedding vectors/vector properties; and text properties such as Font, Color, Size, and Alignment.

Figure 21:
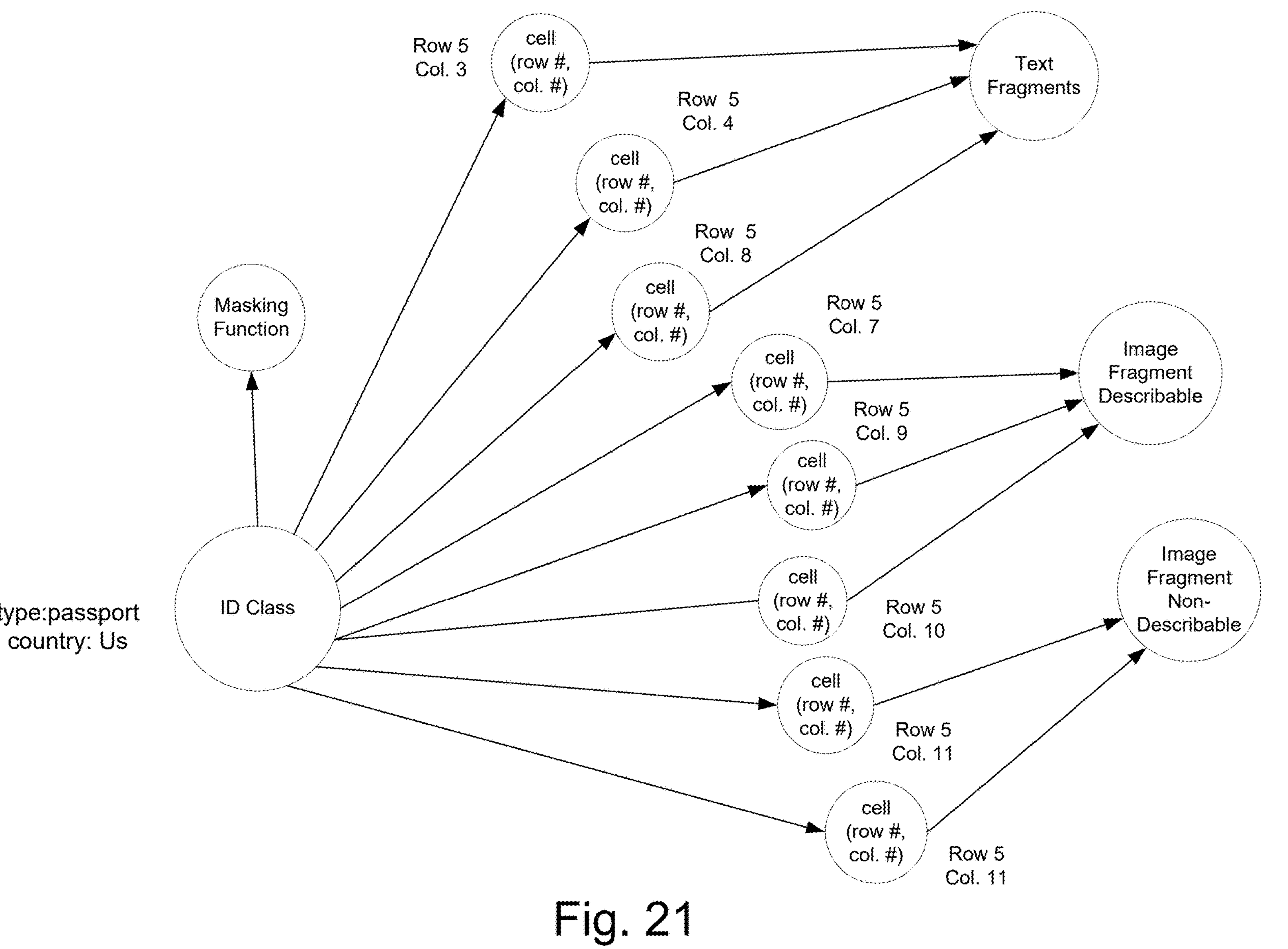
FIG. 21 illustrates an example of graph design in accordance with an implementation.

The graph design for the cellular fragments supports analyzing Variance and invariance Patterns as sub-graph structures to compute anomalies. FIG. 21 illustrates an example of a graph design.

In one implementation, invariant cellular fragments of the same size are used to describe all ID classes. The same number of fragments may be to describe all ID classes with cells outside the image as cells constituting the negative space.

Figure 22:
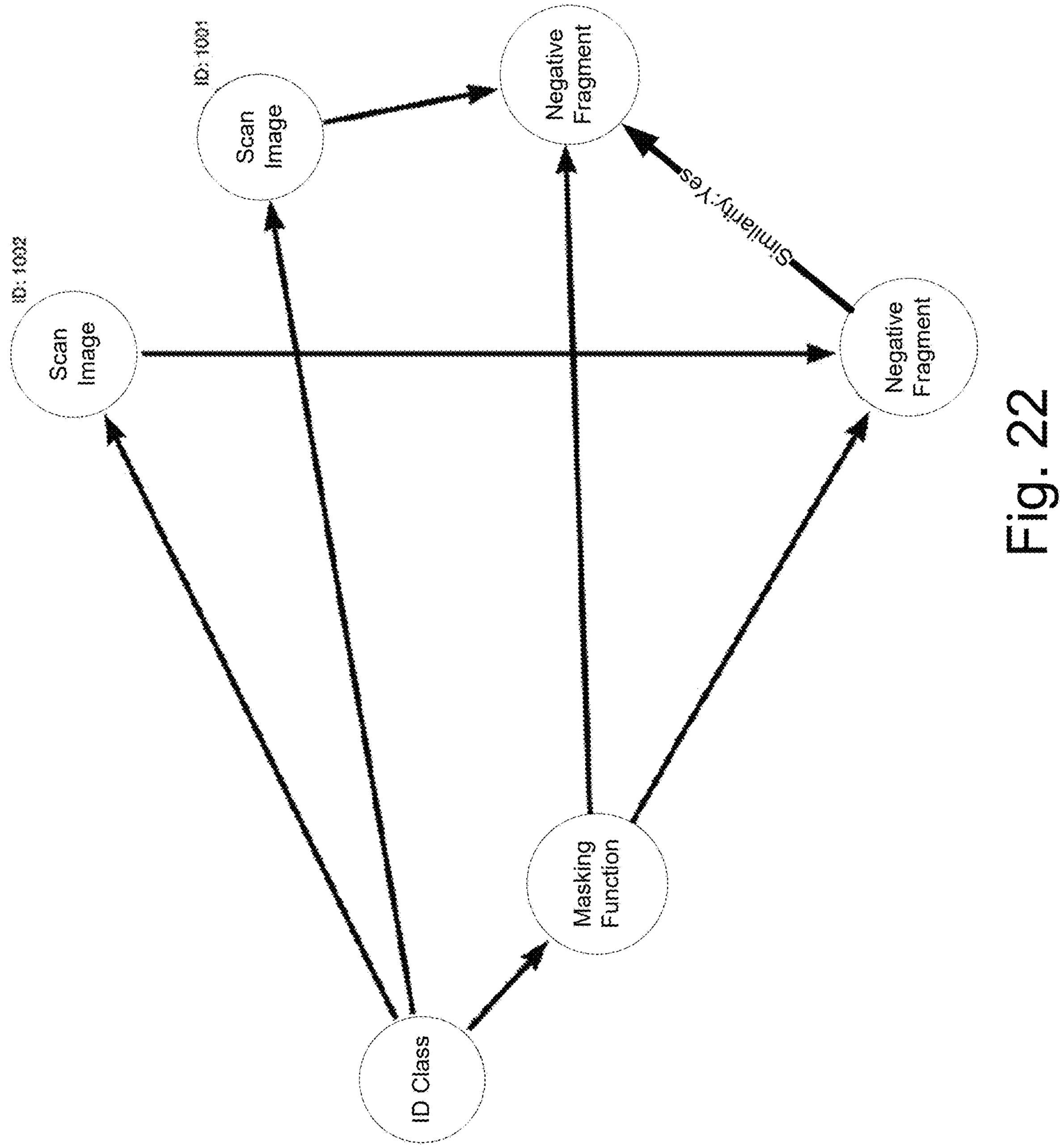
FIG. 22 illustrates an example of graph patterns in accordance with an implementation.

In one implementation, the ID anomaly detector utilizes the formal grammar to describe ID images and store this information in a knowledge graph. All anomaly decisions are then made using a set of graph patterns, with FIG. 22 illustrating an example of a graph pattern. These graph patterns are identified by detecting nodes that are similar when they should not be, and nodes that are identical when they should be different.

In one implementation, the knowledge graph design includes a node for every ID class connected to cellular fragment nodes, as illustrated in FIG. 21. These cellular fragments are then connected to nodes representing text and image fragments. Additionally, every masking function is created as a node and connected to the ID class to which it can be applied.

When a new ID image is processed, it is broken up into fragments and compared with the ground truth in the knowledge graph to identify similarities and assess whether the similarity is an anomaly. For instance, if two distinct ID images have differences in the variant portions but the negative fragments are similar, it is flagged as an anomaly. Similarly, if two distinct ID images have different text fragments but identical images, it is also considered an anomaly.

In one implementation, field level and character level characteristics can be stored in the knowledge graph based on a gold standard of ID samples from each ID document. In one example, individual characters which appear in a specific field of an ID will be captured across many IDs and represented as a vector.

Figure 15A:
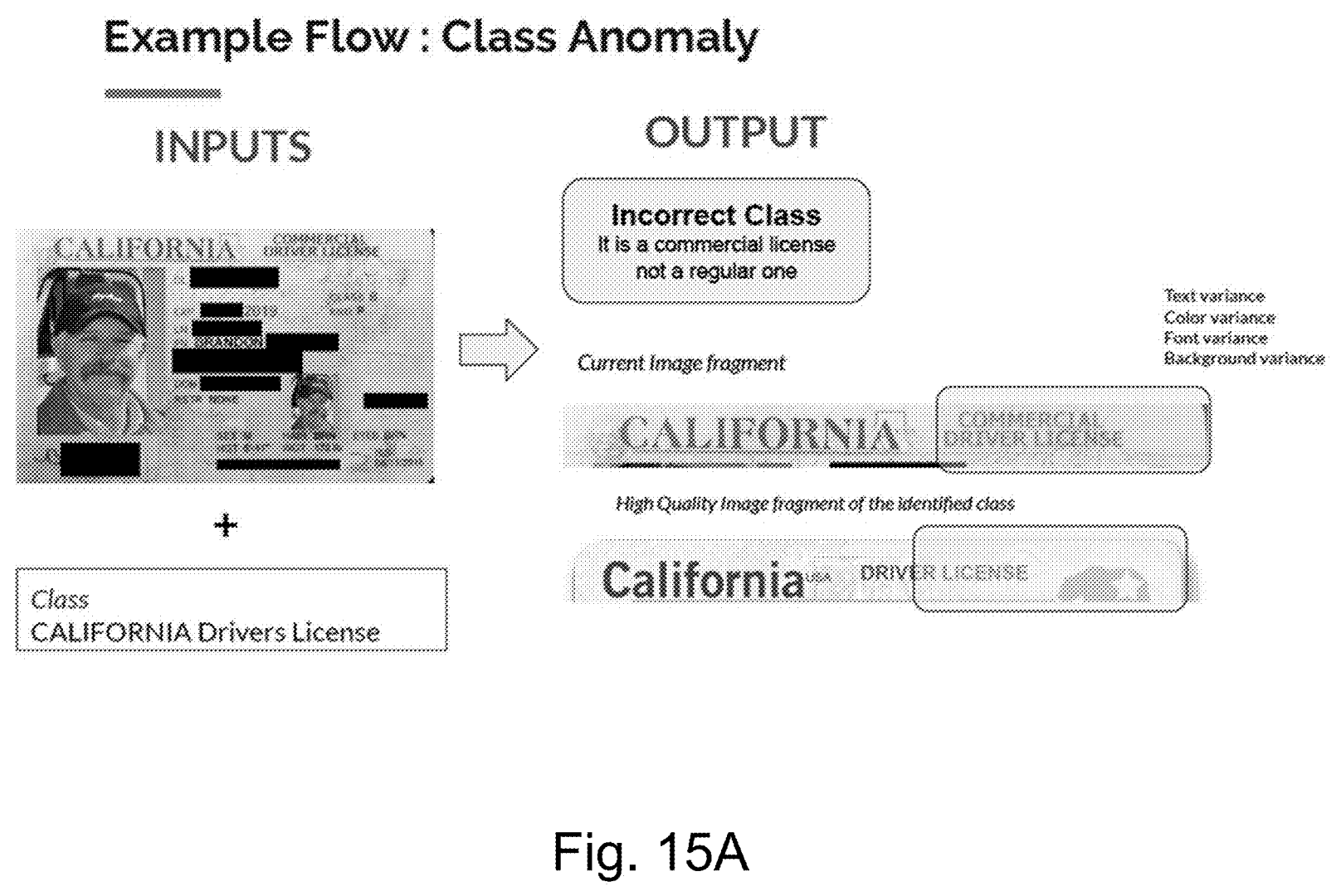

FIG. 15A illustrates an example of inputs and outputs for the ID knowledge graph anomaly detector 130. In this example, the inputs include an image of an ID document, such as an image of a California Driver's license and a class label (in this example the class label is California Driver's License). The output indicates whether the class information is correct (in this example, it is incorrect because the license is a commercial license, not a regular license). The output in this example includes information regarding an image fragment identifying that the license is for a commercial driver's license. Other types of information may be output such as text variance, color variance, font variance, or background variance. The output in this example thus identifies a class error with respect to the class label and provides information about the class error and may also provide other information about other anomalies.

Figure 15B:
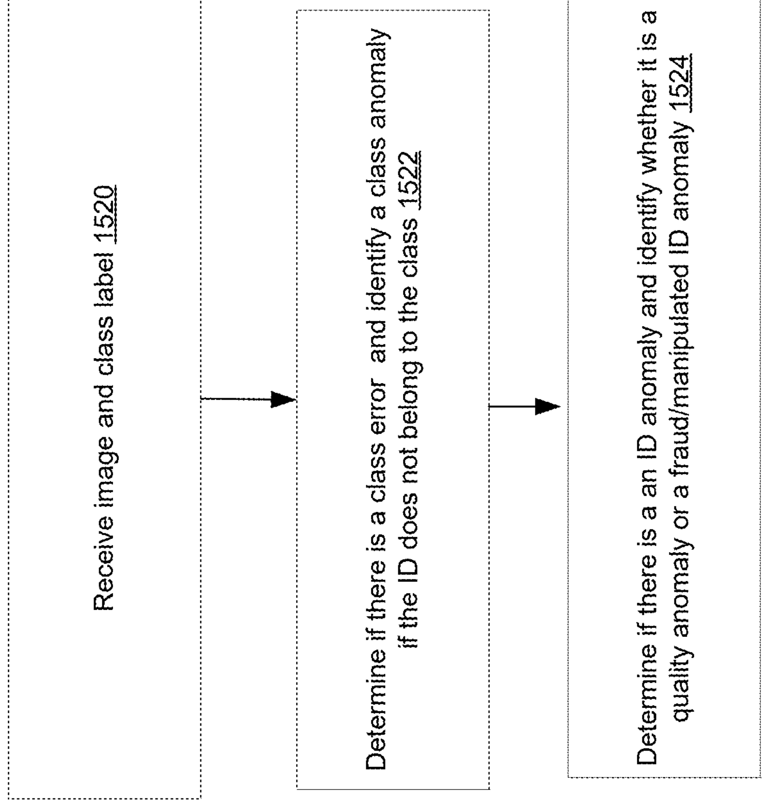
FIG. 15B is a flowchart of a method of identifying class anomalies, quality anomalies, and fraud/manipulated ID anomalies in accordance with an implementation.

FIG. 15B illustrates an exemplary method of making anomaly decisions. In block 1520, ID anomaly detector receives an image of an ID and the recognized class of the ID. In block 1522, a decision is made whether the class label of the ID is correct. For example, if the class label indicated that ID is a California Driver's license but portion of the license differs from a California ID, then the class label is correct. However, if there is a class anomaly, the ID doesn't belong to the class. In one implementation, an identification is made of the parts of the image in comparison to a representative ID in the class to explain the anomaly.

However, if the class label is correct, there may still be ID anomalies. In block 1624, a determination is made if there is an ID anomaly, which may further include identifying whether it is a quality anomaly or a fraud/manipulated ID anomaly.

Quality anomalies are related to parts of the images that are not recognizable, distinguishable or that cannot be interpreted. This may include, for example, text that is not visible. Some other examples of quality anomalies include over and under exposure; glare; unreadable text area that might result in extraction errors.

The Fraud/Manipulated ID anomalies may be associated with parts of the ID, especially in the security areas and around the manipulated areas is missing information or has information discrepancy when compared to a set of high and medium quality IDs of that class. Examples of text manipulation include variance in characters where invariance is expected.

Another example of fraud/manipulated ID includes examples of negative image space/background invariance. Another example includes photo background invariance where variance is expected. Yet another example includes missing security features or a cut off background (variance where invariance is expected). An example of invariant cellular fragments used and their use in detecting ID class is illustrated.

Figure 16A:
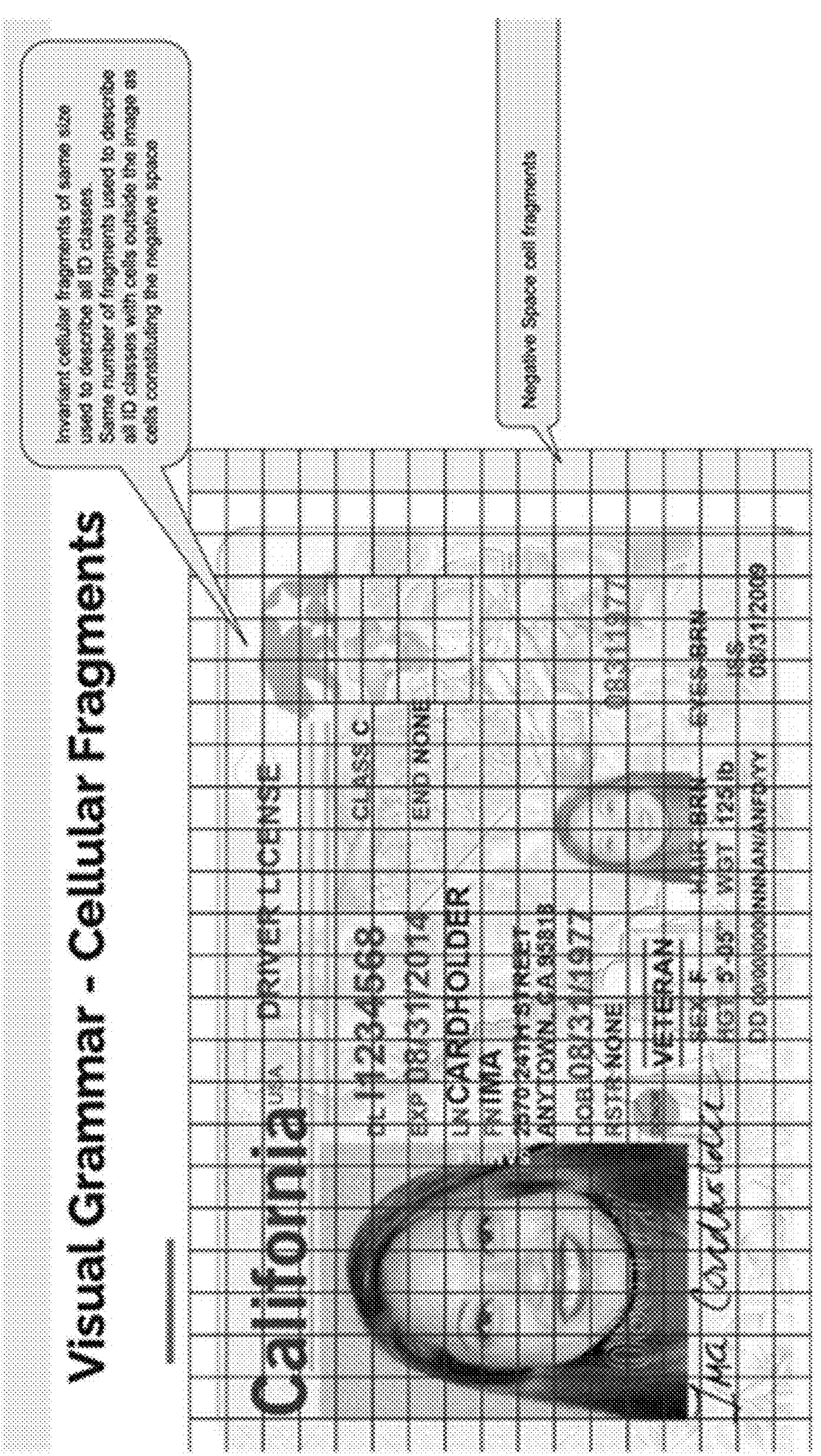
FIG. 16A illustrates an example of a visual grammar with cellular fragments for an example of a California Drivers' License in accordance with an implementation.

FIG. 16A illustrates an example of cellular fragments for a California Driver's License. The grid patten illustrates an example of cellular fragments across the image. At the far right, an example of negative space and fragments is illustrated.

Figures 16B, 16C, 16D:
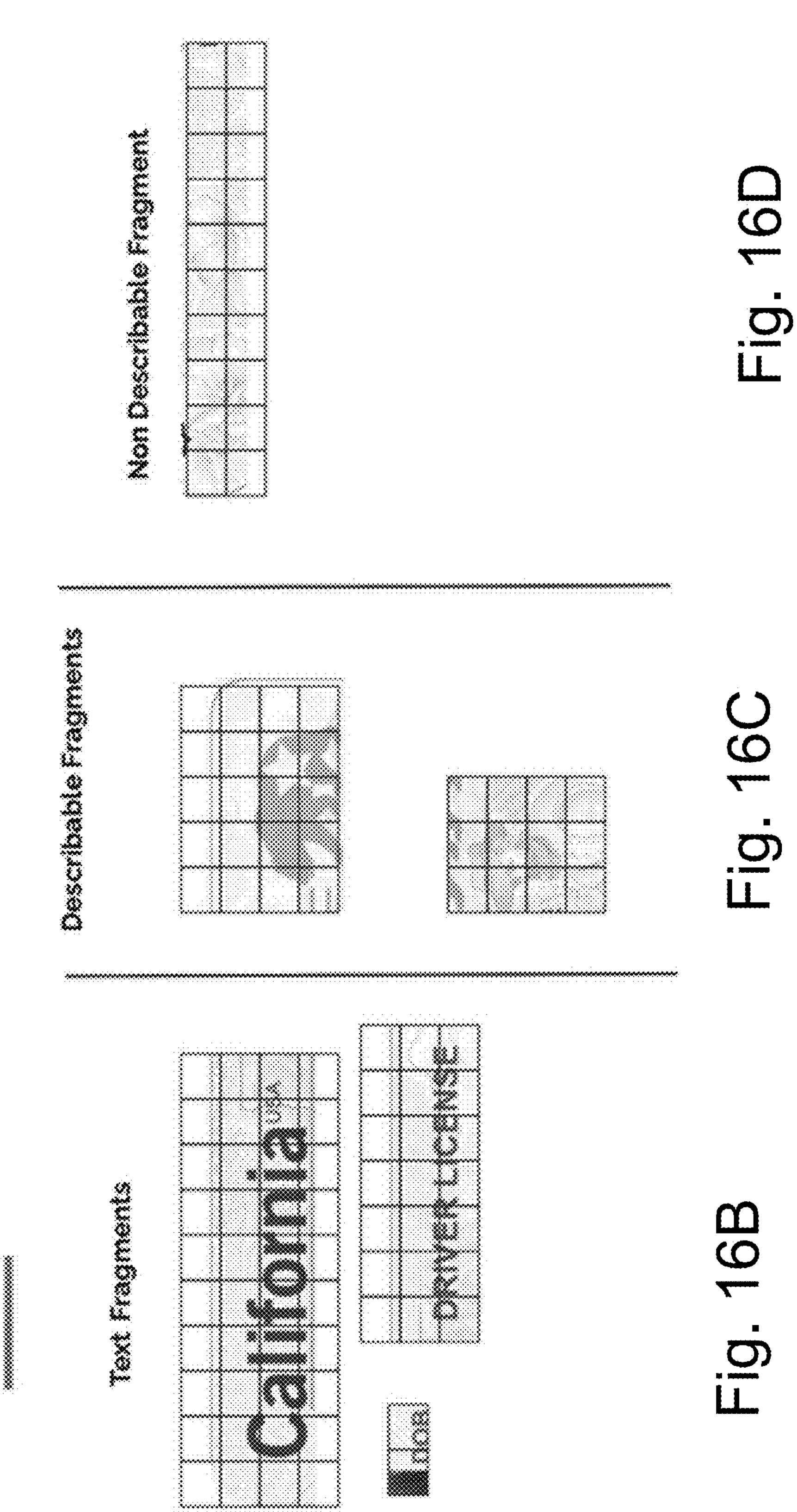
FIG. 16B illustrates text fragments of FIG. 16A as a category of ID image fragment in accordance with an implementation.
FIG. 16C illustrates describable fragments of FIG. 16A as a category of ID image fragment in accordance with an implementation.
FIG. 16D illustrates non-describable fragments of FIG. 16A as a category of ID image fragment in accordance with an implementation.

FIG. 16B illustrates text fragments from the driver's license of FIG. 16A. FIG. 16C illustrates describable fragments from the driver's license of FIG. 16A. For example, a fragment containing an image of a bear and a star is describable. A fragment containing an image of a gold prospector is also describable. FIG. 16D illustrates non-describable fragments from the driver's license of FIG. 16A. For example, a non-describable fragment may include background ornamental features as one of many examples.

As an example, the characters, fonts, shapes, and colors of these characters are different in various different fields of the same ID. Given a dataset of numerous IDs with the same ID type, we can find numerous occurrences of different characters. For example, take the character "8" at the end of the license number in FIG. 7C. One can find numerous appearances of the character "8" in other licenses. A golden standard can be built for character "8" for this specific field of this specific ID type. The golden standard can be converted into a vector or a mathematical representation using different techniques. If a fraudster makes even small changes in the shape, color composition and pixel distribution of any letter of a document and submit it to the knowledge graph for evaluation, the character level golden standard set will be able to capture these differences as anomalies and detect the fraudulent attempt.

FIG. 17A illustrates cellular fragments of a Colorado Driver's License. FIGS. 17B and 17D illustrate examples of textual fragments. FIG. 17C illustrates a describable fragment.

Figure 18A:
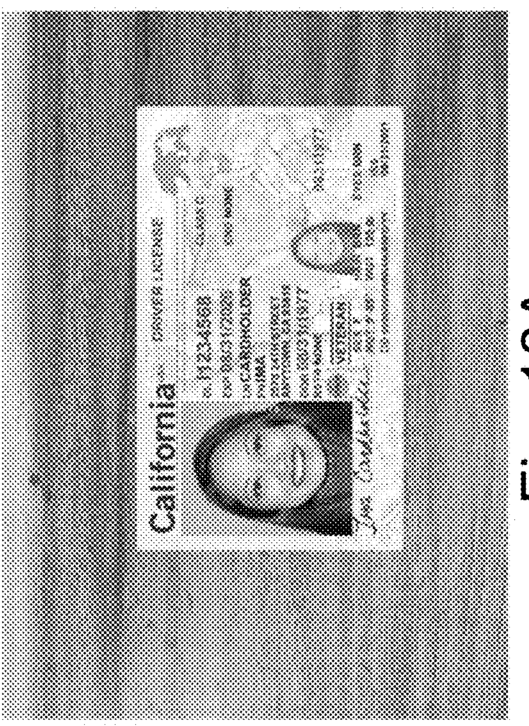
FIG. 18A and FIG. 18B illustrate two different IDs photographed on the same background.
Figure 18B:
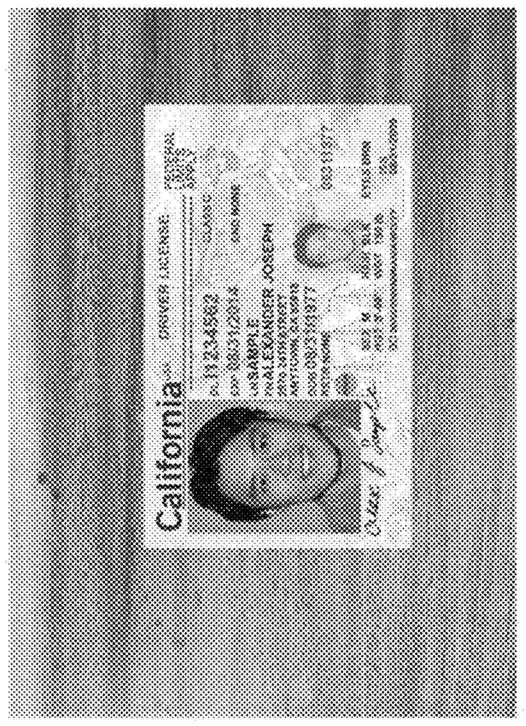

Referring to FIGS. 18A and 18B, fraudsters may sometimes take photos of ID on the same background, such as on the same desk or table. Additionally, in some cases fraudsters take photos of themselves from the same room background.

Figure 18C:
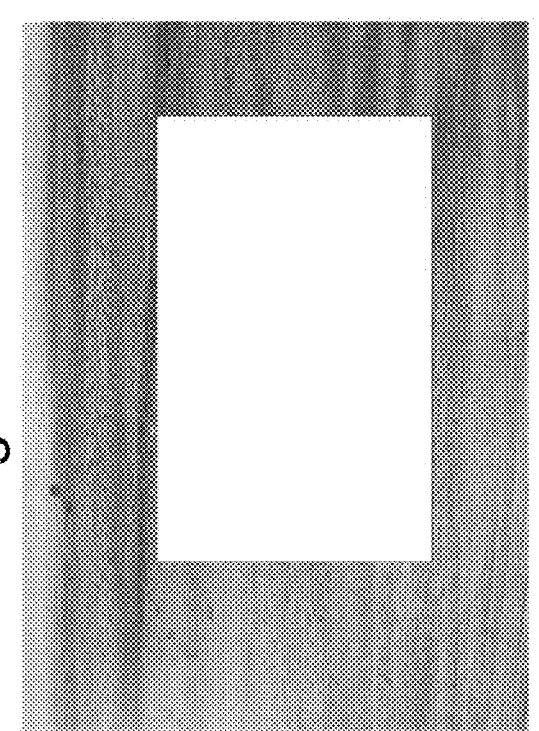
FIGS. 18C and 18D illustrate the IDs of FIGS. 18A and 18B, respectively, with masked fragments to illustrate a variance violation in accordance with an implementation.
Figure 18D:
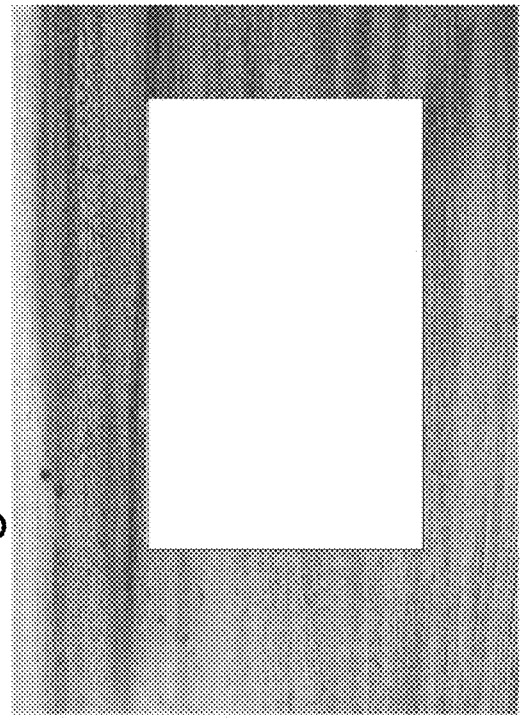

FIG. 18C illustrates the image of FIG. 18A with a masked fragment. FIG. 18D illustrates the image of FIG. 18B with a masked fragment. In this example, there is a variance violation because the backgrounds should be different but have the same background.

Figure 19:
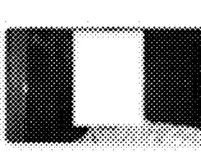
FIG. 19 illustrates selfie face masking, entire ID masking, and face masking on an ID.

As illustrated in FIG. 19 in one implementation, negative space fragments are obtained by masking a portion of a describable image. As some examples, masking may be performed of a face in a selfie or ID; or masking an ID relative to its background. In one implementation, the background which the document is submitted with is analyzed and vectorized as a variant component; if a variant component is repeated in two different instances of unrelated IDs, the knowledge graph will create a fraud alert. In one example, in the preprocessing of an ID document, first the document picture is separated from the background image (i.e., the desk in which the ID sits on when taking the photo).

In this implementation, the background image will be transformed into a mathematical representation (i.e., a vector). This background vector will be compared when a new ID document verification transaction comes in. If two unrelated documents share the variant background vector, the system will create a fraud alert. Fraudsters typically take one picture with a specific background, then change the details of the ID document but rarely change the background. In the real-world, even when the same person is submitting the same ID in the same environment, due to slight changes in camera angle, lighting, and movements in the background, the background images across submission will be slightly different.

In contrast, a fraudster may submit different IDs on the exact same background, such as the background of the same room, such as on the same desk, table, or the same floor/carped. Also, for a fraudster positioning of the IDs during image capture is often identical. This creates what can be called invariance where the expectation is variance.

Figure 20:
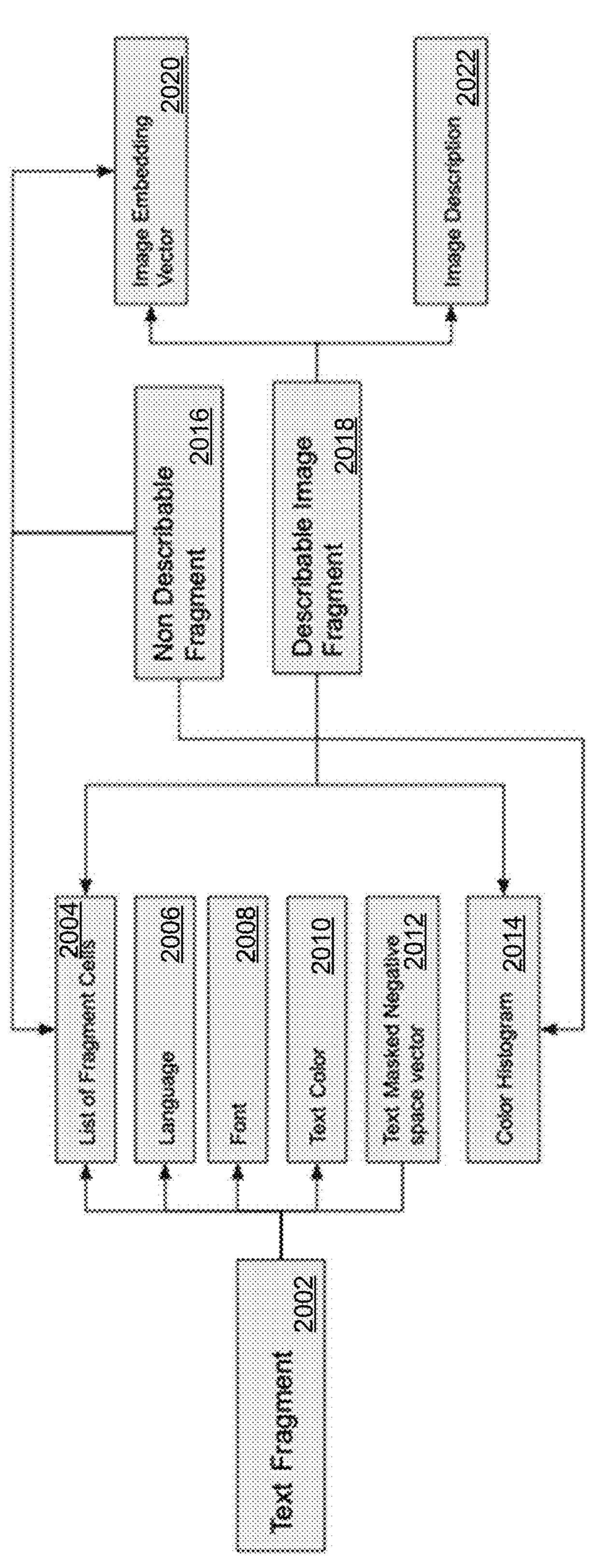
FIG. 20 illustrates an example of fragment properties in accordance with an implementation.

FIG. 20 illustrates an example of fragment properties associated with text fragments 2002, non-describable fragments 2016, and describable image fragment 2018. Some example properties include a list of fragment cells 2004, language 2006, font 2008, text color 2010, text masked negative space vector 2012, and a color histogram 2014. A non-describable fragment 2016 has a color histography. The fragment properties include an image embedding vector 2020 and an image description.

FIG. 21 illustrates an example of a graph design for an ID class. Arrows show associations between the ID class and cellular fragments having specified row and column numbers. Further associations are illustrated for text fragments, image fragments describable, and image fragments non-describable. An association with a masking function is also illustrated.

FIG. 22 illustrates an example of graph patterns in accordance with an implementation. In some implementation, the grammar converts the graph design into sub-graph patterns for detecting fraud between different images. This may include, for example: 1) an invariant sub-graph pattern where variance is expected (e.ge., negative space fragments are matching negative space fragments or invariance of a distinct ID image) and 2) variant sub-graph patterns where invariance is expected (e.g., text fragments are not matching variance even though the photographs are alike). The backgrounds are the negative space fragments around the ID image and in some cases around the face in a photograph.

As some more example, a fraudster may attempt to use different names (sometimes in different languages) for the same face fragment. There can thus be the same face fragment for different text fragments of two or more images.

It should be noted that when IDs are manipulated or faked, their mathematical fingerprint changes. A valid ID has a persistent homology which allows for retrieving mathematical features of an ID that identify it uniquely. As previously discussed, anomaly detection may be performed against a global golden archetype.

OTHER CONSIDERATIONS

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMS, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method of performing identification document (ID) anomaly detection using a knowledge graph, comprising:

generating a hierarchical multidimensional view of identification documents based at least in part on human curated expert knowledge; and providing a knowledge graph base having a knowledge graph schema to define, for each ID type of a plurality of ID types, node labels for image fragments, features of image fragments, relationships between nodes, and select an execution workflow for creating fragments of images, assigning fragment processing functions to the image fragments, and assigning evaluation functions for processed image fragments;

receiving an image of an ID and a class label for the ID associated with an ID type;

initiating a workflow for a received ID, the workflow selected based on a least one attribute of the ID;

performing a fragment creation process to break down the image of the received ID under test into a set of image fragments according to the workflow;

processing features of the image fragments according to fragment processing functions assigned to the image fragments according to the workflow;

evaluating results of the processed image fragments based on the evaluation functions assigned to the processed image fragments according to the workflow; and reporting whether the ID has an anomaly associated with ID fraud, wherein a decision includes comparing the evaluation functions against a gold standard of a valid image.

2. The method of claim 1, wherein the reporting comprises reporting at least one of a class anomaly and an image anomaly.

3. The method of claim 2, comprising creating fingerprints of one or more sub-graphs of the knowledge graph, converting the fingerprints into vectors, comparing the vectors for similarity, and then identifying the sub-graphs for discrepancies and evaluating a risk associated with a discrepancy.

4. The method of claim 3, wherein invariant image fragment features comprise spatial features with two-dimensional spatial relationships between the spatial features of different image fragments.

5. The method of claim 3, wherein invariant image fragment features comprising color features with two-dimensional relationships between the color features of different image fragments.

6. The method of claim 1, wherein the fragment creation process creates a fragment and populates a schema for the fragment with at least one feature property.

7. The method of claim 1, where the fragment processing function includes at least one of: text extraction and image processing.

8. The method of claim 1, further comprising utilizing graph analytics to learn relationship between fragments of individual IDs and across IDs of a same ID type.

9. The method of claim 8, further comprising inferring a set of rules based on learned relationships between fragments.

10. The method of claim 9, further comprising generating a reasoning engine to identify deviations in invariant relationships, identifying potential fraudulent manipulations, and identifying quality issues.

11. The method of claim 1, further comprising separating an image from a background prior to generating image fragments.

12. The method of claim 1, further comprising generating, in test mode, synthetic anomalies and inserting the synthetic anomalies into ID images and fragments.

13. A system comprising:

a processor; and a memory, the memory storing instructions that, when executed by the processor, cause the system to:

generate a hierarchical multidimensional view of identification documents based at least in part on human curated expert knowledge; and utilize a knowledge graph base having a knowledge graph schema to define, for each ID type of a plurality of ID types, node labels for image fragments, features of image fragments, relationships between nodes, select an execution workflow for creating fragments of images, implement a fragment processing function, and implement evaluation functions for processed fragments;

receive an image of an ID;

initiate a workflow for a received ID, the workflow selected based on a least one attribute of the ID;

perform a fragment creation process to break down an image of the received ID under test into a set of image fragments;

process features of the image fragments according to its associated fragment processing functions;

evaluate results of processed image fragments based on an associated evaluation functions; and decide whether the ID has an anomaly associated with ID fraud, wherein the decision includes comparing the evaluation functions against a gold standard of a valid image.

14. The system of claim 13, wherein the image fragments have invariant features.

15. The system of claim 13, comprising creating fingerprints of one or more sub-graphs of the knowledge graph base, converting the fingerprints into vectors, comparing the vectors for similarity, and then identifying the sub-graphs for discrepancies and evaluating a risk associated with the discrepancies.

16. The system of claim 15, wherein the image fragment features comprise spatial features with two-dimensional spatial relationships between the spatial features of different image fragments.

17. The system of claim 15, wherein the image fragment features comprise color features with two-dimensional relationships between the color features of different image fragments.

18. The system of claim 13, wherein a fragment creation function creates a fragment and populates the fragment with at least one feature property.

19. The system of claim 13, where the fragment processing function includes at least one of text extraction and image processing.

20. The system of claim 13, further comprising a graph analytics engine configured to learn relationship between fragments of individual IDs and across IDs of a same type.

21. The system of claim 20, wherein the graph analytics engine generates a set of rules based on the learned relationships between fragments.

22. The system of claim 21, further comprising a reasoning engine to identify deviations in invariant relationships, identify potential fraudulent manipulations, and identify quality issues.

23. The system of claim 13, wherein the image is separated from its background prior to generating image fragments.

24. The system of claim 13, wherein the system is configured to have a test mode to generate and insert synthetic anomalies into ID images and fragments.

* * * * *